United States Patent [19]

Kinoshita et al.

[11] Patent Number: 5,216,517
[45] Date of Patent: Jun. 1, 1993

[54] COMMUNICATION TERMINAL APPARATUS

[75] Inventors: Haruki Kinoshita; Eishi Motohama, both of Hino, Japan

[73] Assignee: Kabushiki Kaisha Toshiba, Kawasaki, Japan

[21] Appl. No.: 934,906

[22] Filed: Aug. 26, 1992

Related U.S. Application Data

[63] Continuation of Ser. No. 789,534, Nov. 8, 1991, abandoned, which is a continuation of Ser. No. 396,659, Aug. 22, 1989, abandoned.

[30] Foreign Application Priority Data

| Aug. 24, 1988 | [JP] | Japan | 63-208080 |
| Aug. 31, 1988 | [JP] | Japan | 63-217245 |
| Oct. 18, 1988 | [JP] | Japan | 63-261857 |
| Dec. 7, 1988 | [JP] | Japan | 63-309668 |
| Jan. 25, 1989 | [JP] | Japan | 1-13993 |

[51] Int. Cl.$^5$ .................................. H04N 1/00
[52] U.S. Cl. ................... 358/400; 358/403; 358/405; 358/407; 358/439; 358/440; 379/100
[58] Field of Search ............... 358/400, 401, 402, 403, 358/404, 405, 406, 407, 434, 435, 436, 438, 439, 440, 442, 444; 379/100

[56] References Cited

U.S. PATENT DOCUMENTS

| 4,432,020 | 2/1984 | Onose et al. | 358/434 |
| 4,524,393 | 6/1985 | Ohzeki | 358/438 |
| 4,646,160 | 2/1987 | Iizuka et al. | 358/402 |
| 4,741,021 | 4/1988 | Kotani et al. | 358/434 |
| 4,785,355 | 11/1988 | Matsumoto | 358/434 |
| 4,870,503 | 9/1989 | Miura | 358/434 |
| 5,130,818 | 7/1992 | Tadokoro | 358/407 |
| 5,157,514 | 10/1992 | Yoshioka | 358/407 |

FOREIGN PATENT DOCUMENTS 58-138165  8/1983  Japan.

Primary Examiner—Edward L. Coles, Sr.
Assistant Examiner—Jerome Grant, II
Attorney, Agent, or Firm—Finnegan, Henderson, Farabow, Garrett & Dunner

[57] ABSTRACT

A communication terminal apparatus connected to a communication network through a data channel for transfer of line transaction data or packet transaction data and through a signal channel for control of a call to a communication destination party. Communication terminal apparatuses are connected to the communication network and subscriber numbers are usually previously designated, as identification data, to all subscribers of the communication network and as necessary, address data (referred to as subaddresses) arbitrarily set among some of these subscribers are attached to the subscriber numbers. These subscriber numbers and subaddresses are transmitted and received through the signal channel separately from transaction data transmitted and received through the data channel. The present apparatus performs predetermined control operations, depending on whether or not the then received subscriber number (subaddress, if necessary) coincides with one of the previously registered subscriber numbers (subaddresses); the operations include:

a) granting or rejecting the reception of the associated transaction data;

b) automatically transmitting the associated transaction data to another communication terminal; and c) displays such auxiliary data as a previously registered subscriber's name corresponding to the subscriber number.

18 Claims, 17 Drawing Sheets

FIG.11

| DESTINATION | 1/1 |

03-123 - - - - -

WE RECEIVED A CALL FROM YOUR COMPANY AT OO : OO, BUT WE COULD NOT ACCEPT IT DUE TO A FAILURE IN OUR MACHINE.

WE ARE NOW READY FOR ACCEPTANCE AS OF OO : OO.

COMPANY : ABC

FAX  03-123-○×△△

COMMUNICATION TERMINAL APPARATUS

This application is a continuation, of application Ser. No. 07/789,534 filed Nov. 8, 1991, which is a continuation of application Ser. No. 07/396,659, filed Aug. 22, 1989 both abandoned.

BACKGROUND OF THE INVENTION

1. Field of the Invention

The present invention relates to communication terminals which are connected to a communication network through a data channel for transfer of such data as line transaction data or packet transaction data and through a signal channel for control of a call to a communication destination party, and more particularly, to a communication terminal apparatus which can realize effective communication processing on the basis of proper identification of subscriber numbers or subaddresses received or transmitted through the signal channel as identification data.

2. Description of the Related Art

In prior art communication networks, a data channel for transfer of transaction data is separated from a signal channel for transfer of control data as mentioned above so that, for example, the control data can always be transmitted through the signal channel independently of voice or picture data as the transaction data or control of a plurality of such data channels can be established through the single signal channel, whereby different sorts of services including telephone, telex and facsimile can be efficiently and integrally realized. One of these prior art communication networks is, as well known, an ISDN (Integrated Services Digital Network).

In the ISDN, the above data channel is referred to as the B channel and the above signal channel is referred to as the D channel. Through the D channel of the signal channel, in particular, identification data on caller communication terminals can also be transmitted as control data. Accordingly, a communication terminal to be called can know, on the basis of the identification data of the caller communication terminal received through the D channel, one of the communication terminals which issued the transmission data (voice or picture data) of the B channel. The identification data includes subscriber numbers previously designated to subscribers of the communication network and subaddresses arbitrarily set among some of the subscribers as additional data to the subscriber numbers. The subaddresses, which are attached to some of the subscriber numbers as necessary, are used, for example, when it is desired to specify one of a group of terminals (user in-home facilities) to which a common subscriber number is designated.

Such ISDN can indeed realize such various sorts of services as mentioned above integrally and efficiently and also can allow the signal-received (receiver) communication terminals to recognize the caller communication terminal on the basis of the identification data of an incoming signal received from the D channel. In the prior art communication terminal apparatus connected to the ISDN, however, the identification data has been used only for the purpose of the recognition or identification of the caller terminal and processing, control and so on concerning the actual communication have been separately carried out through operator's control panel. As a result, the ISDN has not fully been utilized in overall communication efficiency.

For example, the following utilization forms (a) to (e) are highly important for the purpose of realizing improved user interface as a communication terminal apparatus and thus realizing a high communication efficiency of the overall communication network. However, it has been impossible for the existing communication terminal apparatus, even how it is connected to the ISDN, to realize these utilization forms.

(a) Transaction data sent from the specific communication terminal can be automatically transmitted to another specific communication terminal.

(b) The operator at the communication terminal to be called can immediately know the caller subscriber (caller communication terminal).

(c) The specific communication terminal can be automatically set in its specific mode independently of the communication protocol.

(d) When the communication terminal to be called is in its communication disable state and later the state is removed, a message indicative of removal of such state is automatically sent to the caller communication terminal.

(e) Arbitrary incoming-signal reception conditions are set with use of the above identification data and arbitrary incoming-signal reception control is carried out on the basis of the satisfaction or unsatisfaction of the conditions.

SUMMARY OF THE INVENTION

In view of such circumstances, it is an object of the present invention to provide a communication terminal apparatus which is connected to a communication network comprising a data channel for transfer of transaction data and a signal channel for transfer of control data, with excellent user interface and improved communication efficiency.

An object of the present invention is to provide a communication terminal apparatus which can automatically and effectively transmit transaction data sent from a specific communication terminal to another specific communication terminal.

Another object of the present invention is to provide a communication terminal apparatus which allows the operator of a called communication terminal to immediately know the caller subscriber (caller communication terminal).

A further object of the present invention is to provide a communication terminal apparatus which can automatically set a specific communication terminal in a specific operational mode independently of its communication protocol.

Yet another object the present invention is to provide a communication terminal apparatus which, when a called communication terminal is in its communication disable state and later the state is removed, can automatically transmit a message indicative of removal of the communication disable state to the caller communication terminal.

Yet a further object of the present invention to provide a communication terminal apparatus which can set arbitrary incoming-signal reception conditions with use of the above identification data and can perform arbitrary incoming-signal reception control on the basis of satisfaction or unsatisfaction of the conditions.

In order to attain such objects, in accordance with a fundamental aspect of the present invention, a single or a plurality of predetermined identification data are previously registered in a memory (first memory), an identification data received at the present apparatus is temporarily stored in a suitable memory (second memory), and predetermined control is carried out when the identification data temporarily stored in the second memory coincides with one of the predetermined identification data of the first memory.

With such an arrangement, a communication terminal apparatus to be called can automatically execute the associated desired control without any operator's intervention, whereby the communication terminal apparatus can be efficiently utilized.

In accordance with another aspect of the present invention, a transaction data transmitted through the above data channel is temporarily stored in a memory (third memory), other registration identification data are also previously registered as associated with the predetermined identification data of the first memory in a memory (fourth memory), and when the identification data temporarily stored in the second memory coincides with one of the predetermined identification data of the first memory, said predetermined control is carried out so that the transaction data transmitted is stored in the third memory as associated with the identification data temporarily stored in the second memory, one of the registration identification data of the fourth memory corresponding to the coincided identification data of the first memory is automatically called, the transaction data of the third memory is automatically transmitted again to the communication terminal apparatus corresponding to the called registration identification data.

With such an arrangement, the present communication terminal apparatus having these memories and control means can automatically transmit an incoming signal data to a desired destination without requiring any operator's intervention.

According to a further aspect of the present invention, suitable display means is provided, such auxiliary data including company titles and person names in charge relating to subscribers are previously registered in a memory (fifth memory) as associated with the predetermined identification data of the first memory, and when the received identification data of the second memory coincides with one of the predetermined identification data of the first memory, the above predetermined control is carried out so that one of the auxiliary data corresponding to the coincided identification data of the first memory is read out from the fifth memory and then displayed on the display means.

As a result, the operator of the present communication terminal, when receiving an incoming signal, can immediately confirm the caller subscriber.

According to yet another aspect of the present invention, mode data indicative of a single or a plurality of operational modes of the present communication terminal apparatus are previously registered, in the form of a table, in a memory (sixth memory) as associated with the identification data, in particular, part or all of the subaddress data, and the above predetermined control is carried out so that, when the received identification data of the second memory coincides with one of the predetermined identification data of the first memory, one of the mode data corresponding to the associated subaddress data is read out from the sixth memory and one of the operational modes corresponding to the read-out mode data is automatically executed.

With such an arrangement, the caller communication terminal apparatus can suitably control the present communication terminal apparatus on a remote control basis.

Yet a further aspect of the present invention comprises, at least, a sensor for detecting a communication disable state of the present communication terminal apparatus, a memory (seventh memory) for separately storing therein the received identification data of the second memory, and a memory (eighth memory) for previously registering therein message data notifying return to a communication enable state, wherein control is carried out so that, when the sensor detects the communication disable state, the received identification data of the second memory is transferred to the seventh memory and stored therein, while, when the detection of the communication disable state by the sensor is released, the received identification data of the seventh memory is automatically called and the message data of the eighth memory is automatically transferred to the communication terminal apparatus corresponding to the called identification data.

As a result, the caller communication terminal apparatus can smoothly be operated and the waste time due to the communication disable state can be eliminated.

In other aspect of the present invention, incoming-signal reception setting means is provided for separately setting the incoming-signal reception conditions of the transaction data transmitted through the data channel and control is carried out so that granting or rejection of the reception of the then incoming signal is selected depending on whether or not the conditions set by the incoming-signal reception setting means is satisfied.

With such an arrangement, the present communication terminal apparatus can automatically select incoming-signal reception with a high degree of freedom.

BRIEF DESCRIPTION OF THE DRAWINGS

FIG. 11 schematically shows an example of message document data to be stored in a message memory in FIG. 10;

DESCRIPTION OF THE PREFERRED EMBODIMENTS

Figure 1:
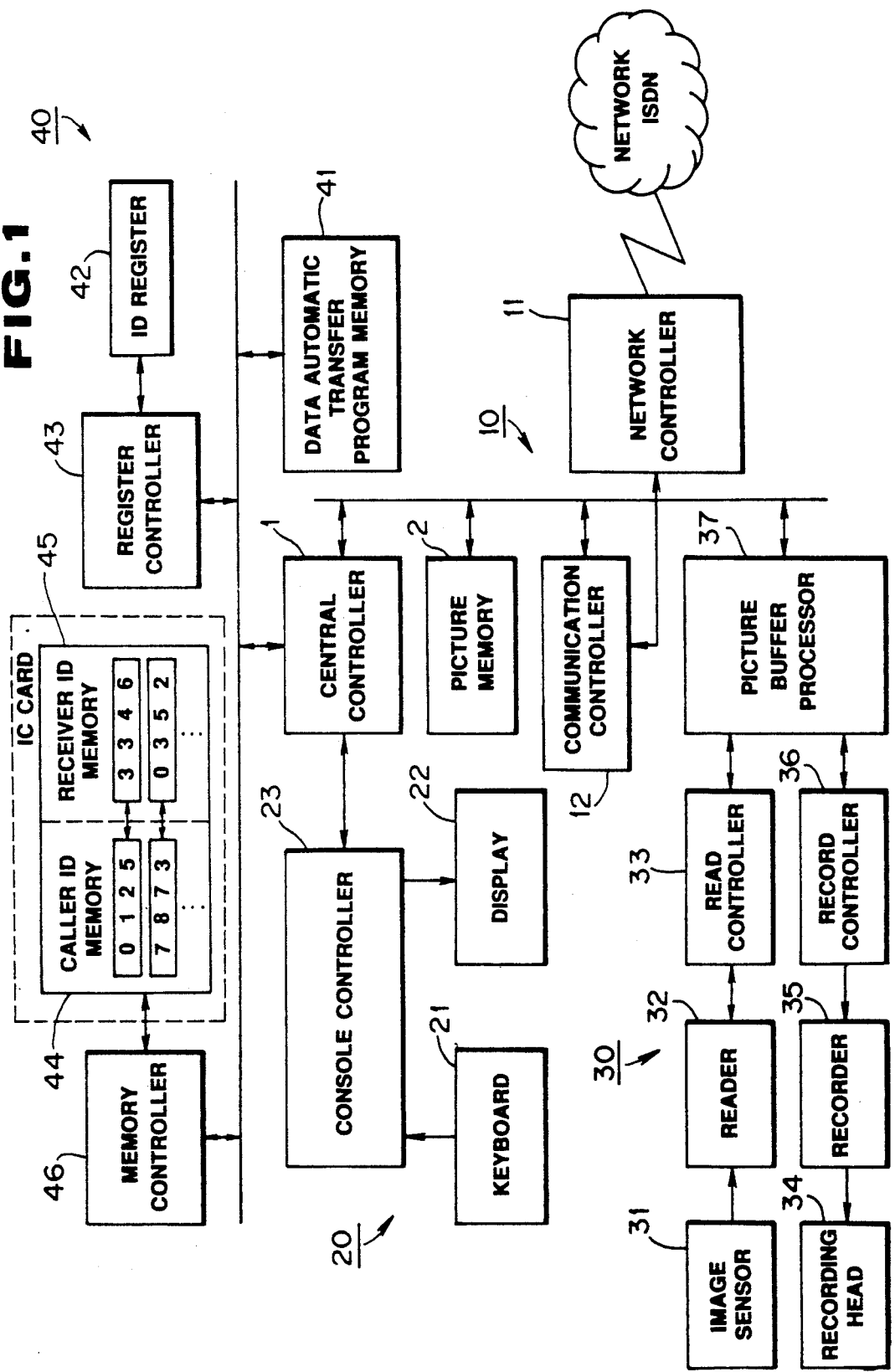
FIG. 1 is a block diagram showing the arrangement of a first embodiment of a communication terminal apparatus in accordance with the present invention.

Referring first to FIG. 1, there is shown a communication network apparatus of a first embodiment in accordance with the present invention, in which embodiment the apparatus is intended to be a facsimile machine connected to the aforementioned ISDN as its communication network.

As shown in FIG. 1, the apparatus of the first embodiment comprises, a central controller 1 for performing general control over the embodiment apparatus, a picture memory 2 for temporarily storing therein picture data as necessary under control of the central controller 1, a communication part 10 for performing mainly control and processing of the communication of the embodiment apparatus, a console part 20 for performing data or information transaction with the user (operator), a picture processing part 30 for executing such picture processing as reading or writing a picture data as the facsimile machine, and a first expansion part 40 for realizing automatic data (picture data) transfer processing to be detailed later in association with the functions of these parts 1, 10, 20 and 30.

More in detail, the communication part 10 includes a network controller 11 connected to the ISDN through the aforementioned B and D channels (not shown) and a communication controller 12 for realizing a communication control function based on a G4 or G3 mode as the facsimile machine. The communication part 10 functions mainly to execute a calling processing to the ISDN based on a command from the central controller 1 or an incoming-signal processing when receiving an incoming signal (incoming call) from the ISDN. Whether the communication part 10 actually executes the incoming-signal processing when receiving an incoming signal, is determined by a command received from the central controller 1.

The console part 20 includes a keyboard 21 through which the operator provides a calling operation or a key input operation to the apparatus, a display 22 for visually indicating thereon an operation guide data or another necessary data, and a console controller 23 for transmitting input data from the keyboard 21 to the central controller 1 or for controllably causing the input data from the keyboard 21 or display command data from the central controller 1 to be indicated on the display 22. An operator's ordinary calling operation is carried out through the console part 20 (the central controller 1 recognizes the calling operation and initiates the communication part 10). A caller number or the like upon reception of an incoming signal is visually informed to the operator also through the console part 20.

The picture processing part 30 includes a reader 32 for reading the picture of an original document through an image sensor 31 such as a CCD sensor, a read controller 33 for controlling the picture reading operation of the reader 32 in a predetermined manner to digitalize the read picture and form a picture signal, a recorder 35 for recording on a recording paper the picture indicative of the picture signal (digital signal) through such a recording head 34 as a thermal head, a record controller 36 for sending the picture signal to the recorder 35 in such a manner that the recording operation is suitably controlled, and a picture buffer processor 37, under control of the central controller 1, for performing buffer processing over the picture signal received from the read controller 33 and transferring it to the communication part 10 (communication controller 12) or for performing buffer processing over a picture signal received from the communication part 10 (communication controller 12) and sending it to the record controller 36. The picture processing part 30 functions to perform picture reading and recording operations known in an ordinary facsimile machine.

The first expansion part 40 includes a data automatic-transfer-program memory 41 for previously storing therein processing commands to the central controller 1 in the form of a program to realize a picture-data automatic transfer processing to be explained later, an ID register 42 for temporarily storing therein a caller subscriber number as an identification data ID when an incoming signal received at the communication part 10 contains the subscriber number, a register controller 43 for controlling the reading and writing operations of the data (number) of the ID register 42 under control of the central controller 1, a caller ID memory 44 for previously registering therein a single or a plurality of such caller subscriber numbers as identification data IDs specifying associated callers (callers' communication terminals: facsimile machines), a receiver ID memory 45 for previously registering a single or a plurality of receiver subscriber numbers which specify associated communication terminals (facsimile machines) to be transferred, and a memory controller 46 for controlling the reading and writing operations of the data (number) of these memories 44 and 45 in accordance with commands from the central controller 1. The subscriber number to be registered in the caller ID memory 44 as well as the subscriber number to be registered in the receiver ID memory 45 are entered through the keyboard 21 with the help of, for example, a suitable guide display on the screen of the display 22 respectively as the caller subscriber (facsimile machine) number of a picture data to be transferred and as the receiver subscriber (facsimile machine) number of the picture data to be transferred. When a plurality of such receiver subscriber numbers and a plurality of such caller subscriber numbers are registered respectively for the same data to be transferred, these caller and receiver subscriber numbers for the same data are stored in the memories 44 and 45 as associated with each other in predetermined relationship, for example, by using the same or associated address data.

Figure 2:
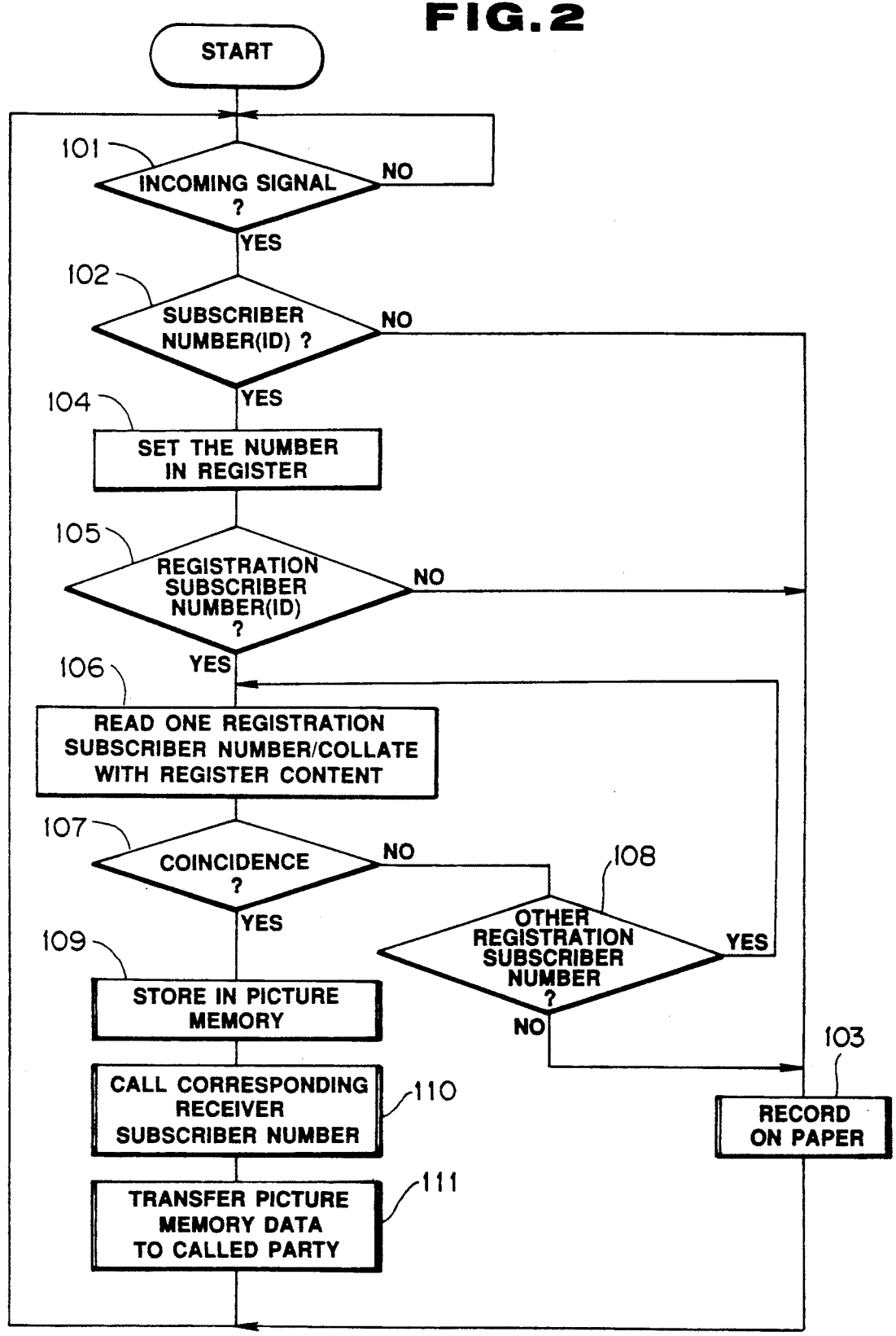
FIG. 2 is a flowchart showing an example of the operation of the communication terminal apparatus of the first embodiment shown in FIG. 1.

Shown in FIG. 2 is a flowchart showing an example of the operation of the embodiment apparatus based on the function of the first expansion part 40 (in particular, in accordance with the program registered in the data automatic-transfer-program memory 41). The picture-data automatic transfer mechanism of the apparatus of the first embodiment will be detailed by referring to FIG. 2.

Assume now that another communication terminal (not shown facsimile machine) connected to the ISDN issued a signal to the first embodiment apparatus shown in FIG. 1. Then the caller communication terminal first sends to the ISDN a signal for calling the first embodiment apparatus (which signal is referred to as the calling signal). The calling signal usually contains a data indicative of a caller subscriber number previously designated to the signal-originator (caller) communication terminal.

The calling signal thus sent to the ISDN from the caller communication terminal is received as an incoming call signal at the network controller 11 of the embodiment apparatus through the ISDN line (D channel).

The first embodiment apparatus, when receiving the incoming call signal at the network controller 11 and recognizing the presence of the incoming signal at the central controller 1 (step 101 in FIG. 2), starts its processing in the following manner.

(1) The central controller 1, when recognizing the presence of the incoming signal on the basis of a notification from the network controller 11, checks through the network controller 11 whether or not the incoming signal contains the caller subscriber number of the caller communication terminal (step 102 in FIG. 2).

(2) When having determined that the caller subscriber number is not included in the incoming signal, the central controller 1 controls the embodiment apparatus to perform its usual incoming-call answering operation. That is, in this case, a picture data sent together with the incoming signal is suitably demodulated through the communication controller 12, transmitted to the picture buffer processor 37 and then recorded on a recording paper through the recorder 35 (step 103 in FIG. 2).

(3) When determining (in step 102 in FIG. 2) that the caller subscriber number is included in the incoming signal, the central controller 1 causes the register controller 43 to set (store) the included caller subscriber number in the ID register 42 (step 104 in FIG. 2). At this time, if another caller subscriber number (corresponding to the previous incoming signal) is already set in the ID register 42, then the previous caller subscriber number is replaced by the new one for its renewal, unless the ID register 42 is cleared each time the processing is completed.

(4) The central controller 1 next checks whether or not the caller subscriber number for specifying the caller is previously registered in the caller ID memory 44 (step 105 in FIG. 2).

(5) The controller 1, when determining that the caller subscriber number is not registered, controls the embodiment apparatus to perform its usual incoming-call answering operation as in (2). Thereby, picture data being sent as associated with the incoming call signal is suitably demodulated through the communication controller 12, transmitted to the picture buffer processor 37 and then recorded on a recording paper through the recorder 35, as has been explained above.

(6) The controller 1, when determining that the caller subscriber number included in the incoming signal is registered in the caller ID memory 44 (step 105 in FIG. 2), reads out associated one of the caller subscriber numbers from the caller ID memory 44 through the memory controller 46 and compares the read subscriber number with the subscriber number set in the ID register 42 (step 106 in FIG. 2).

(7) When determining to be a non-coincidence in subscriber number as the comparison result (step 107 in FIG. 2), the central controller 1 repeats the above processing (6) (step 106 in FIG. 2) so long as other caller subscriber numbers are registered in the caller ID memory 44 (step 108 in FIG. 2). When the central controller 1 determines that none of the subscriber numbers registered in the caller ID memory 44 coincide with the subscriber number set in the ID register 42, the controller 1 controls the embodiment apparatus to perform its usual incoming-call answering operation as in the above processing (2) (step 103 in FIG. 2).

(8) When determining through comparison (step 106 in FIG. 2) a subscriber number coincidence (step 107 in FIG. 2), the central controller 1 answers the incoming call and then stores in the picture memory 2 the picture data received through the network controller 11 and the communication controller 12 (step 109 in FIG. 2).

(9) When the input picture data has been stored in the picture memory 2 in this way, or in other words, when the above coincided subscriber number has already been registered in the caller ID memory 44, the central controller 1 next reads out from the receiver ID memory 45 one of receiver subscriber numbers registered in the receiver ID memory 45 which is associated with the coincided caller subscriber number through the memory controller 46, and performs the calling operation of the read receiver subscriber number (desired subscriber number to be transferred) through the communication controller 12 and the network controller 11 (step 110 in FIG. 2).

(10) When the calling operation causes the present apparatus to be put in a data transaction enable state with the party communication terminal (the facsimile machine to be called), the central controller 1 finally transfers the picture data stored in the picture memory 2 to the party communication terminal newly put in the communication state (step 111 in FIG. 2). Of course, such data transfer is carried out also under the communication controller 12 and the network controller 11 making up the communication part 10.

Through the above processings of the apparatus of the first embodiment, the present embodiment apparatus can also be used as a relay terminal to realize picture data automatic transfer between the specific communication terminals. In other words, even if the operator of the present apparatus is absent, favorable picture data transfer can be effected between the communication terminals (facsimile machines) each having a registered number, so long as the unique numbers are previously registered in the caller and receiver ID memories 44 and 45, thus realizing the flexible utilization of these communication terminals.

In the first embodiment apparatus, the above calling processing (9) and data transfer processing (10) may be parallelly carried out utilizing the idle data channel (B channel) while the above picture data is stored in the picture memory 2 during reception of the picture data, or alternatively may be separately started after the completion of communication with the caller party (caller communication terminal).

In the foregoing embodiment, in the case where a plurality of subscriber numbers are registered in each of the caller and receiver ID memories 44 and 45, these numbers are read therein on one-after-one basis for comparison through the processings of steps 106, 107 and 108 of FIG. 2. However, such a reading-in control system of these subscriber numbers under the memory controller 46 is not restricted to the above specific one and may be arbitrarily carried out so long as all the subscriber numbers registered can be compared or collated. That is, this comparison or collation processing, of course, may be carried out as by reading all the registered subscriber numbers at the same time collectively in a register (not shown) incorporated in the central controller 1.

Further, only subscriber numbers have been used as identification data IDs respectively uniquely specifying communication terminals in the above embodiment. Since a subaddress together with a caller subscriber number is also sometimes included in an incoming signal in such a communication network, this subaddress may also be positively utilized as an identification data ID specifying one of the communication terminals. In this case, this subaddress of the incoming signal is also temporarily stored together with the subscriber number of the incoming signal in the ID register 42 and also arbitrary subaddresses are previously registered together with the associated subscriber numbers specifying caller communication terminals in the caller ID memory 44. When the present embodiment apparatus receives an incoming signal, the apparatus executes the above data automatic transfer processing only under the condition that the subscriber number and subaddress of the incoming signal both coincide with associated ones of the registered subscriber numbers and subaddresses respectively. The identification data IDs to be registered in the receiver ID memory 45 may comprise only subscriber numbers or may comprise subscriber numbers added with associated subaddresses. At least when such subaddresses are added to the associated subscriber numbers as in the latter, desired ones of the communication terminals to which the data is to be transferred can be more finely specified.

In either case (in both cases of subscriber numbers with and without associated subaddresses), the number of caller identification data IDs (caller subscriber numbers) to be registered in the caller ID memory 44 may be set to have a one-plurality or plurality-one relationship with the number of receiver identification data IDs (receiver subscriber numbers) to be registered in the receiver ID memory 45 as associated with the caller ones.

In the case where these identification data IDs are registered in the one-plurality relationship (one caller and a plurality of receivers), picture data from the single caller communication terminal is transferred to the plurality of desired communication terminals at the same time or on a time series basis.

In the case where these identification data IDs are registered in the plurality-one relationship (a plurality of callers and one receiver), picture data separately sent from the plurality of caller communication terminal are separately transferred to the single desired receiver communication terminal.

Explanation has been made in the foregoing first embodiment on the assumption that these caller and receiver ID memories 44 and 45 are both memories incorporated in the facsimile machine of the first embodiment, but one or both of the caller and receiver ID memories 44 and 45 may comprise an external memory freely attachable to the body of the facsimile machine as shown by a broken line in FIG. 1. When such an external memory is employed, the data of the callers and receivers concerning data transfer can be freely carried. In addition, if the external memory is such a simple IC-card writing device, then the writing operation can be easily achieved at any place. From the viewpoint of realizing the more flexible applications of the present apparatus as a communication terminal, it is highly important to positively make these memories 44 and 45 in the form of such an external memory.

Figure 3:
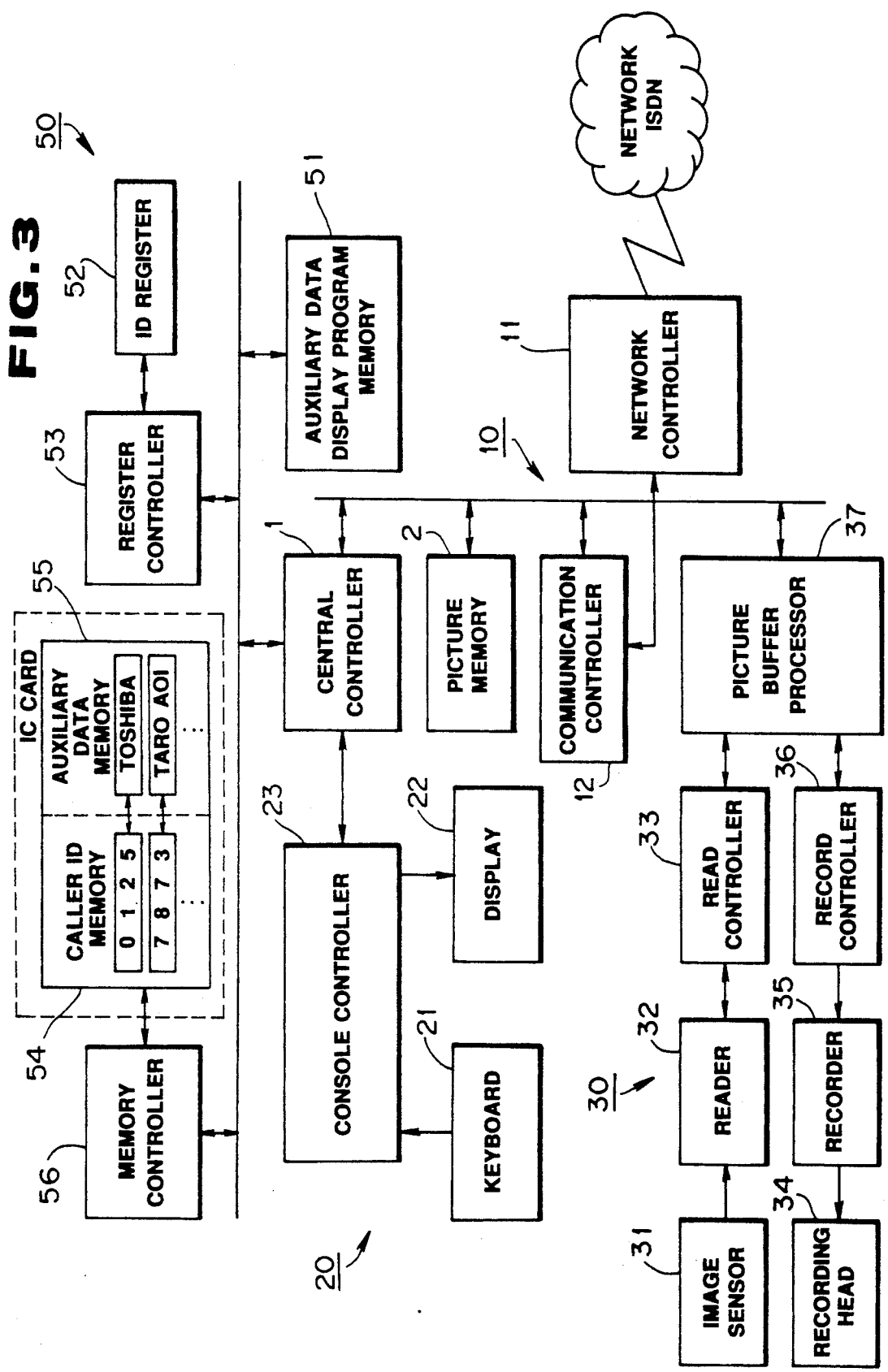
FIG. 3 is a block diagram showing the arrangement of a second embodiment of the communication terminal apparatus in accordance with the present invention.

FIG. 3 shows a second embodiment of the communication terminal apparatus of the present invention, in which embodiment the apparatus is intended to be a facsimile machine connected to the ISDN, as in the first embodiment.

The apparatus of the second embodiment, as shown in FIG. 3, comprises, as a whole, a central controller 1 for performing general control over the embodiment apparatus, a picture memory 2 for temporarily storing therein picture data as necessary under control of the central controller 1, a communication part 10 for performing mainly control and processing on the communication of the embodiment apparatus, a console part 20 for performing data or information transaction with the user (operator), a picture processing part 30 for executing such picture processing as reading or writing a picture data as the facsimile machine, and a second expansion part 50 for realizing auxiliary data display processing to be detailed later in association with the functions of these parts 1, 10, 20 and 30. The parts other than the second expansion part 50 are the same as those in the first embodiment apparatus of FIG. 1 and thus the following explanation will be concentrated on the arrangement and function of the second expansion part 50.

As shown in FIG. 3, the second expansion part 50 includes an auxiliary-data display program memory 51 for previously storing therein processing commands to the central controller 1 in the form of a program to realize an auxiliary data display processing to be explained later, an ID register 52 for temporarily storing therein a caller subscriber number when an incoming signal received at the communication part 10 contains the subscriber number as an identification data ID, a register controller 53 for controlling the reading and writing operations of the data (number) of the ID register 52 on the basis of commands from the central controller 1, a caller ID memory 54 for previously registering therein a single or a plurality of caller subscriber numbers as identification data IDs specifying associated callers (callers' communication terminals: facsimile machines), an auxiliary data memory 55 for previously registering therein auxiliary data including such proper noun data as the business titles to which the subscribers associated with the subscriber numbers belong and subscribers' names and including such document data as notes on the subscribers, and a memory controller 56 for controlling the reading and writing operations of the data of these memories 54 and 55 in accordance with commands from the central controller 1.

The subscriber number to be registered in the caller ID memory 54 as well as the auxiliary data to be registered in the auxiliary data memory 55 are entered through the keyboard 21 with the help of, for example, a suitable guide display on the screen of the display 22 respectively as the caller subscriber number of the auxiliary data to be transferred for automatic display and as the specific character data. When a plurality of such caller numbers and a plurality of such auxiliary data are registered respectively for the same data to be transferred, these caller subscriber numbers and auxiliary data for the same data are stored in the memories 54 and 55 as associated with each other in predetermined relationship, for example, by using the same or associated address data.

Figure 4:
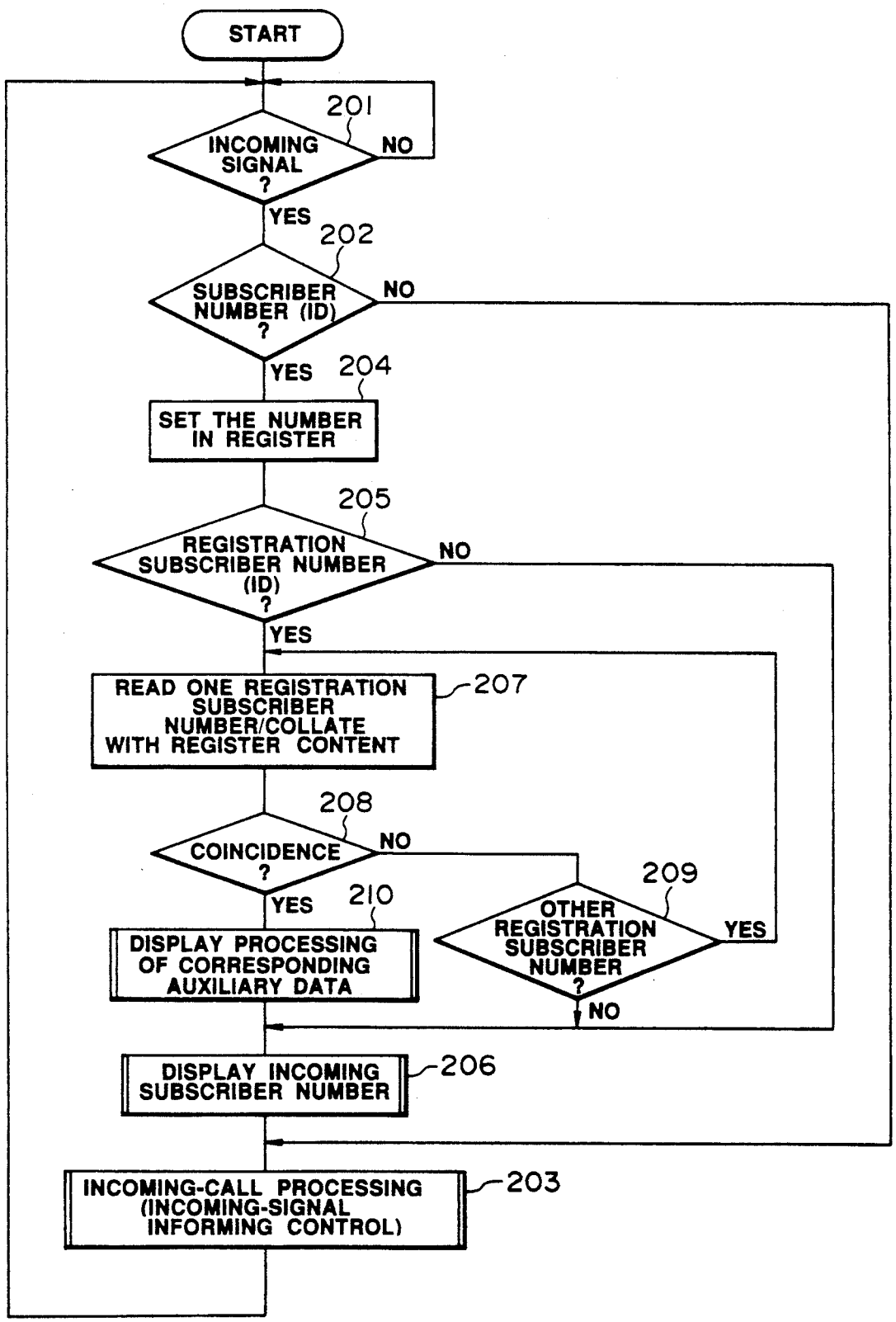
FIG. 4 is a flowchart showing an example of the operation of the communication terminal apparatus of the second embodiment shown in FIG. 3.

Shown in FIG. 4 is an example of the operation of the embodiment apparatus based on the function (in particular, a program registered in the above auxiliary data display program memory 51) of the second expansion part 50. The auxiliary data automatic display mechanism of the apparatus of the second embodiment will be detailed with reference to FIG. 4.

Assume now that another communication terminal (not shown facsimile machine) connected to the ISDN issued a signal to the second embodiment apparatus shown in FIG. 3. Then the caller communication terminal first sends to the ISDN a signal for calling the second embodiment apparatus (which signal is referred to as the calling signal). The calling signal usually contains data indicative of a caller subscriber number previously designated to the signal-originator (caller) communication terminal.

The calling signal thus sent to the ISDN from the caller communication terminal is received as an incoming call signal at the network controller 11 of the embodiment apparatus through the ISDN line (D channel).

The second embodiment apparatus, when receiving the incoming call signal at the network controller 11 and recognizing the presence of the incoming signal at the central controller 1 (step 201 in FIG. 4), starts its processing in the following manner.

(1) The central controller 1, when recognizing the presence of the incoming signal on the basis of a notification from the network controller 11, checks through the network controller 11 whether or not the incoming signal contains the caller subscriber number of the caller communication terminal (step 202 in FIG. 4).

(2) When having determined that the caller subscriber number is not included in the incoming signal, the central controller 1 controls the embodiment apparatus to perform its usual incoming-signal informing operation (step 203 in FIG. 4).

(3) When determining (in step 202 in FIG. 4) that the caller subscriber number is included in the incoming signal, the central controller 1 causes the register controller 53 to set (store) the included caller subscriber number in the ID register 52 (step 204 in FIG. 4). At this time, if another caller subscriber number (corresponding to the previous incoming signal) is already set in the ID register 52, then the previous caller subscriber number is replaced by the new one for its renewal, unless the ID register 52 is cleared each time the processing is completed.

(4) The central controller 1 next checks whether or not the caller subscriber number for specifying the caller is previously registered in the caller ID memory 54 (step 205 in FIG. 4).

(5) The controller 1, when determining that the caller subscriber number is not registered, controls the embodiment apparatus to display the subscriber number of the incoming signal, i.e., the subscriber, number set in the ID register 52 on the display 22 through the console controller 23 (step 206 in FIG. 4) and to performs its usual incoming-signal informing operation as in the above processing (2) (step 203 in FIG. 4).

(6) The controller 1, when determining that the caller subscriber number included in the incoming signal is registered in the caller ID memory 54 (step 205 in FIG. 4), reads out the associated one of the caller subscriber numbers from the caller ID memory 54 through the memory controller 56 and compares the read subscriber number with the subscriber number set in the ID register 52 (step 207 in FIG. 4).

(7) When there is a non-coincidence in subscriber number as the comparison result (step 207 in FIG. 4), the central controller 1 repeats the above processing (6) (step 207 in FIG. 4) so long as other caller subscriber numbers are registered in the caller ID memory 54 (step 209 in FIG. 4). When the central controller 1 determines that none of the subscriber numbers registered in the caller ID memory 54 coincide with the subscriber number set in the ID register 52, the controller 1 controls the embodiment apparatus to display the subscriber number set in the ID register 52 on the display 22 through the console controller 23 (step 206 in FIG. 4) and performs its usual incoming-signal informing operation as in the above processing (5) (step 203 in FIG. 4).

(8) When determining through comparison (step 207 in FIG. 4) a subscriber number coincidence (step 208 in FIG. 4), the central controller 1 reads out through the memory controller 56, the auxiliary data memory 55 as associated with the coincided subscriber number (step 206 in FIG. 4). Subsequently, the central controller 1 controls the present embodiment apparatus to also display the subscriber number set in the ID register 52 on the display 22 through the console controller 23 as in the above processing (5) (step 206 in FIG. 4) and performs its incoming-signal informing operation (step 203 in FIG. 4).

Through the above processings of the apparatus of the second embodiment, the business title and name of the caller subscriber as well as a note on the subscriber can be automatically indicated on the display 22 simultaneously with the reception of the incoming call. As a result, inconvenience such as that the party can be confirmed only after the apparatus has received the transaction data, i.e., only after the apparatus has been put in its communication state can be eliminated, thus realizing smoother operation of incoming-call processing.

The second embodiment apparatus is substantially the same as the first embodiment apparatus shown in FIG. 1 with respect to the following points.

The reading control system of subscriber numbers through the memory controller 56 is not restricted to the aforementioned system but may be arbitrarily employed so long as the system allows the comparison or collation of all the subscriber number being registered in the caller ID memory 54.

The aforementioned subaddress may be positively utilized as an identification data ID uniquely specifying the caller communication terminals.

One or both of the caller ID memory 54 and the auxiliary data memory 55 may comprise such an external memory freely detachable from the body of the communication terminal apparatus (facsimile machine) as an IC card.

Figure 5:
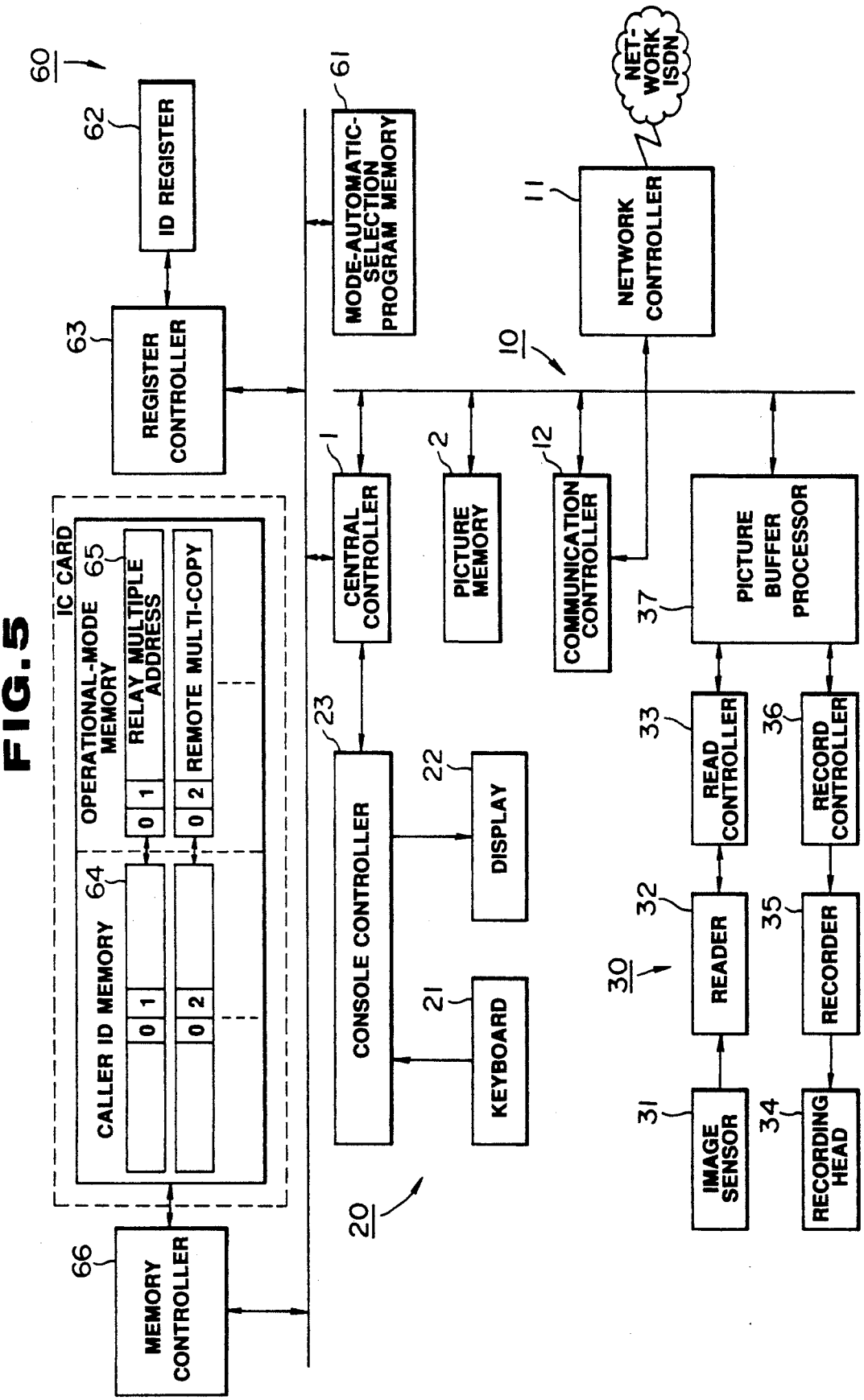
FIG. 5 is a block diagram showing the arrangement of a third embodiment of the communication terminal apparatus in accordance with the present invention.

FIG. 5 shows a third embodiment of the communication terminal apparatus of the present invention, in which embodiment the apparatus is also intended to be a facsimile machine connected to the ISDN, as in the first embodiment.

The apparatus of the third embodiment, as shown in FIG. 5, comprises a central controller 1 for performing general control over the embodiment apparatus, a picture memory 2 for temporarily storing therein picture data as necessary under control of the central controller 1, a communication part 10 for performing mainly control and processing on the communication of the embodiment apparatus, a console part 20 for performing data or information transaction with the user (operator), a picture processing part 30 for executing such picture processing as reading or writing a picture data the facsimile machine, and a third expansion part 60 for realizing operational-mode automatic selection processing of the third embodiment apparatus to be detailed later in association with the functions of these parts 1, 10, 20 and 30. The parts other than the third expansion part 60 are the same as those in the first embodiment apparatus of FIG. 1 or those in the second embodiment apparatus of FIG. 3 and thus the following explanation will be concentrated on the arrangement and function of the third expansion part 60.

As shown in FIG. 5, the third expansion part 60 includes a mode automatic selection program memory 61 for previously storing therein processing commands to the central controller 1 in the form of a program to realize operational-mode automatic selection processing to be explained later, an ID register 62 for temporarily storing therein a caller subscriber number and/or a subaddress when an incoming signal received at the communication part 10 contains the subscriber number and its subaddress as an identification data ID, a register controller 63 for controlling the reading and writing operations of the data (number) of the ID register 62 on the basis of commands from the central controller 1, a caller ID memory 64 for previously registering therein a single or a plurality of caller subscriber numbers as identification data IDs specifying associated caller communication terminals and a single or a plurality of subaddresses as identification data IDs specifying the specified communication terminals and the selected operational modes, an operational mode memory 65 for previously registering therein data indicative of the operational modes selectable in the communication terminal (present embodiment apparatus) in association with the subaddresses (in the present embodiment, only a part thereof), and a memory controller 66 for controlling the reading and writing operations of the data of these memories 64 and 65 in accordance with commands from the central controller 1.

Explanation will next be made as to relationships between the subscriber numbers and subaddresses as their addtional data and as to the relationship between the subaddresses and the associated operational modes, respectively by referring to FIGS. 6a, 6b and 7.

Figure 6:
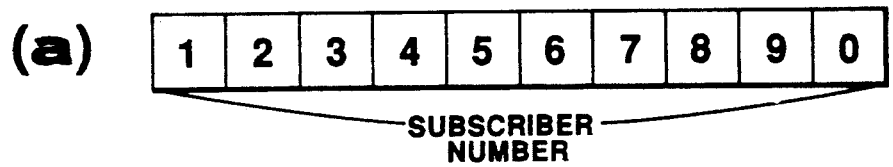
FIGS. 6a and 6b schematically shows, in a model form, the concept of a subscriber number and a subaddress utilized as identification data.

The subscriber number, as shown in FIG. 6(a), is identification number data of a predetermined length previously designated to one of subscribers for the communication network. In other words, the user cannot change the subscriber number freely.

Meanwhile, the subaddress is an identification number data which can be freely determined and set by some parties among the subscribers of the communication network. When an identical subscriber number is designated to a plurality of communication terminals, the subaddress is usually used, in many applications, as a so-called "terminal identification data" to specify one of the communication terminals all having the same subscriber number.

To this end, the present third embodiment is arranged so that the subaddress is divided, for example, as shown in FIG. 6(b), into "function identification data" for specifying one of the set operational modes and "terminal identification data" for specifying one of the communication terminals. One of the operational modes can be identified, in particular, by the former "function identification data".

Figure 7:
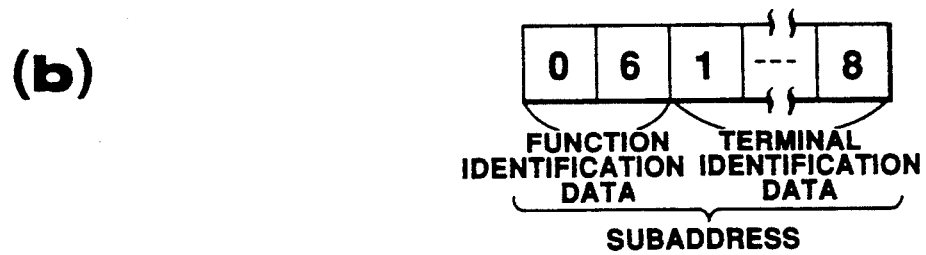
FIG. 7 shows, in a tabular form, contents of data to be stored in an operational-mode memory in FIG. 5.

Shown in FIG. 7 is an example showing relationships between the "function identification data" and associated operational modes, in which "function identification data" 01 specifies "relay multiple address" as an operational mode, "function identification data" 02 specifies "remote multi-copy" as an operational mode, . . , and so on. That is, the third embodiment apparatus is intended, when an operational mode is specified by "function identification data" in the subaddress in this way, to identify and automatically execute the specified operational mode.

The subscriber number and its subaddress to be registered in the caller ID memory 64 are entered through operator's keyboard 21 with the help of, e.g., a suitable guide indication on the screen of the display 22 in such formats as shown in FIGS. 6(a) and 6(b) in the form of number data which specify a caller communication terminal capable of specifying the shift of the embodiment apparatus to such operational mode, the base communication terminal (the third embodiment apparatus) and the operational mode the embodiment apparatus can automatically execute, respectively. The operational mode data to be registered in the operational-mode memory 65 is also entered through the keyboard 21 with the help of, e.g., a suitable guide indication on the screen of the display 22 in such a format as shown in FIG. 7 in the form of a data indicative of the operational mode placed at the "function identification data" of the subaddress. When a plurality of such identification data and a plurality of such operational modes are registered, the identification data ID (subscriber number and subaddress) and operational mode data are stored in the memories 54 and 55 in predetermined relationships with each other, for example, by using an identical or associated address data for the subscriber and its operational mode.

Figure 8:
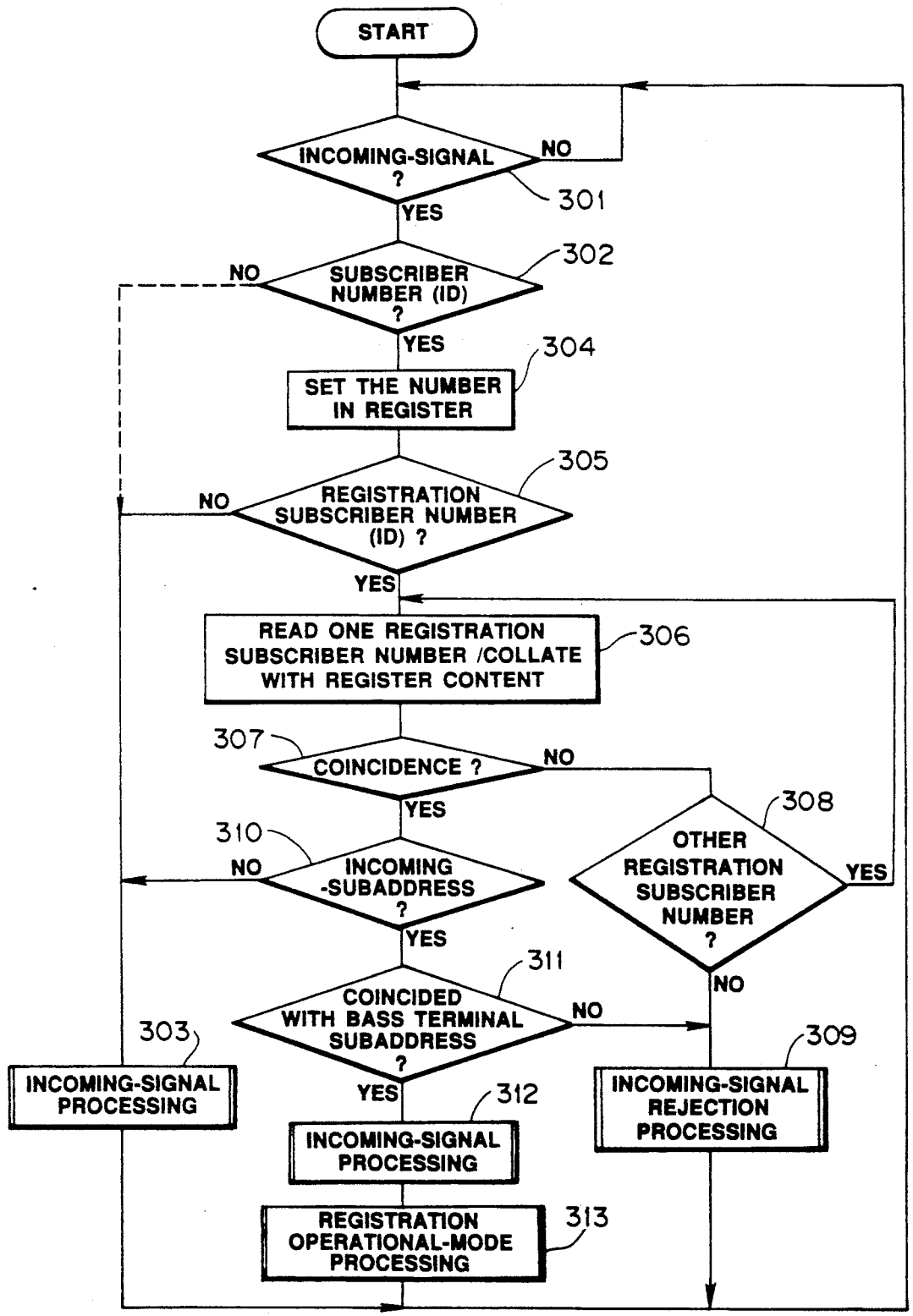
FIG. 8 is a flowchart showing an example of the operation of the communication terminal apparatus of the third embodiment shown in FIG. 5.

FIG. 8 shows an example of the operation of the third embodiment apparatus based on the function (in particular, a program registered in the aforementioned mode automatic-selection program memory 61) of the third expansion part 60. The operational-mode automatic-selection mechanism of the third embodiment apparatus will be detailed in the following by referring to FIG. 8.

Assume now that another communication terminal (a not shown facsimile machine) connected to the ISDN issued a signal to the third embodiment apparatus shown in FIG. 5. Then the caller communication terminal first sends to the ISDN a signal for calling the third embodiment apparatus (which signal is referred to as the calling signal). The calling signal usually contains a data indicative of a caller subscriber number previously designated to the signal-originator (caller) communication terminal and a subaddress as its additional data.

The calling signal thus sent to the ISDN from the caller communication terminal is received as an incoming call signal at the network controller 11 of the embodiment apparatus through the ISDN line (D channel).

The third embodiment apparatus, when receiving the incoming call signal at the network controller 11 and recognizing the presence of the incoming signal at the central controller 1 (step 301 in FIG. 8), starts its processing in the following manner.

(1) The central controller 1, when recognizing the presence of the incoming signal on the basis of a notification from the network controller 11, checks through the network controller 11 whether or not the incoming signal contains the caller subscriber number of the caller communication terminal (step 302 in FIG. 8).

(2) When having determined that the caller subscriber number is not included in the incoming signal, the central controller 1 controls the embodiment apparatus to perform its usual incoming-signal processing operation (step 303 in FIG. 8). In this case, the setting of the control conditions is arbitrary and of course, the central controller 1 may control the embodiment apparatus to select and perform an incoming-signal rejection processing to be explained later (step 309 in FIG. 8).

(3) When determining (in step 302 in FIG. 8) that the caller subscriber number is included in the incoming signal, the central controller 1 causes the register controller 63 to set (store) the included caller subscriber number in the ID register 62 (step 304 in FIG. 8). At this time, if another caller subscriber number (corresponding to the previous incoming signal) is already set in the ID register 62, then the previous caller subscriber number is replaced by the new one for its renewal, unless the ID register 62 is cleared each time the processing is completed. Further, if the subscriber number of the incoming signal is attached with a subaddress, then the subaddress is also set in the ID register 62.

(4) The central controller 1 next checks whether or not the caller subscriber number for specifying the caller is previously registered in the caller ID memory 64 (step 305 in FIG. 8).

(5) The controller 1, when determining that the caller subscriber number is not registered, controls the embodiment apparatus to perform its usual incoming-signal processing operation as in the above processing (2) (step 303 in FIG. 8).

(6) The controller 1, when determining that the caller subscriber number included in the incoming signal is registered in the caller ID memory 64 (step 305 in FIG. 8), reads out associated one of the caller subscriber numbers from the caller ID memory 64 through the memory controller 66 and compares the read subscriber number with the subscriber number set in the ID register 62 (step 306 in FIG. 8).

(7) When there is a non-coincidence in subscriber number as the comparison result (step 307 in FIG. 8), the central controller 1 repeats the above processing (6) (step 306 in FIG. 8) so long as other caller subscriber numbers are registered in the caller ID memory 64 (step 308 in FIG. 8). When the central controller 1 determines that none of the subscriber numbers registered in the caller ID memory 64 coincide with the subscriber number set in the ID register 62, the controller 1 controls the embodiment apparatus to perform a usual incoming-signal rejection processing (step 309 in FIG. 8).

(8) When determining through comparison (step 306 in FIG. 8) a subscriber number coincidence (step 307 in FIG. 8), the central controller 1 then makes reference to the contents of the ID register 62 and checks whether or not the subscriber number is attached with a subaddress (step 310 in FIG. 8).

(9) The controller 1, when determining through the check that no subaddress is attached to the subscriber number, also controls the embodiment apparatus to perform its usual incoming-signal as in the above processing (2) or (5) (step 303 in FIG. 8).

(10) When determining through the comparison (step 310 in FIG. 8) that a subaddress is attached to the subscriber number, the central controller 1 further reads out through the memory controller 66 the base terminal subaddress registered in the caller ID memory 64 as associated with the coincided subscriber number, and checks whether or not the read subaddress coincides with the subaddress being set in the ID register 62 (step 311 in FIG. 8).

(11) As the result of the check, if the controller 1 determines a subaddress coincidence, then it controls the embodiment apparatus to perform its incoming-signal rejecting operation as in the above processing (7) (step 309 in FIG. 8).

(12) The central controller 1, when determining through the above check (step 311 in FIG. 8) a subaddress coincidence, performs its incoming-singal processing operation in accordance with the predetermined transmission control procedure (step 312 in FIG. 8), reads out through the memory controller 66 one of the operational mode data registered in the operational-mode memory 65 and corresponding to the "function identification data" in the coincided subaddress and then controls the third embodiment apparatus to be automatically shifted to the operational mode indicative of the read-out operational-mode data (step 313 in FIG. 8).

The above processing of the third embodiment apparatus enables the realization of remote control of the third embodiment apparatus through a control terminal or specific relay communication terminal (registered in the caller ID memory 64). That is, so long as arbitrary numbers and data are previously registered in the caller ID memory 64 and the operational-mode memory 65, all the processing of the registered operational modes can be automatically attained through the communication terminals having these registered numbers, even if any operator is absent at the embodiment apparatus, thereby realizing more flexible and efficient utilization of these communication terminals. In addition, since such remote control is effected independently of the communication protocol, the operational-mode automatic-selection processing of this embodiment is generally valid even for communication terminals that are manufactured by different makers and operated according to different communication protocols.

Figure 9:
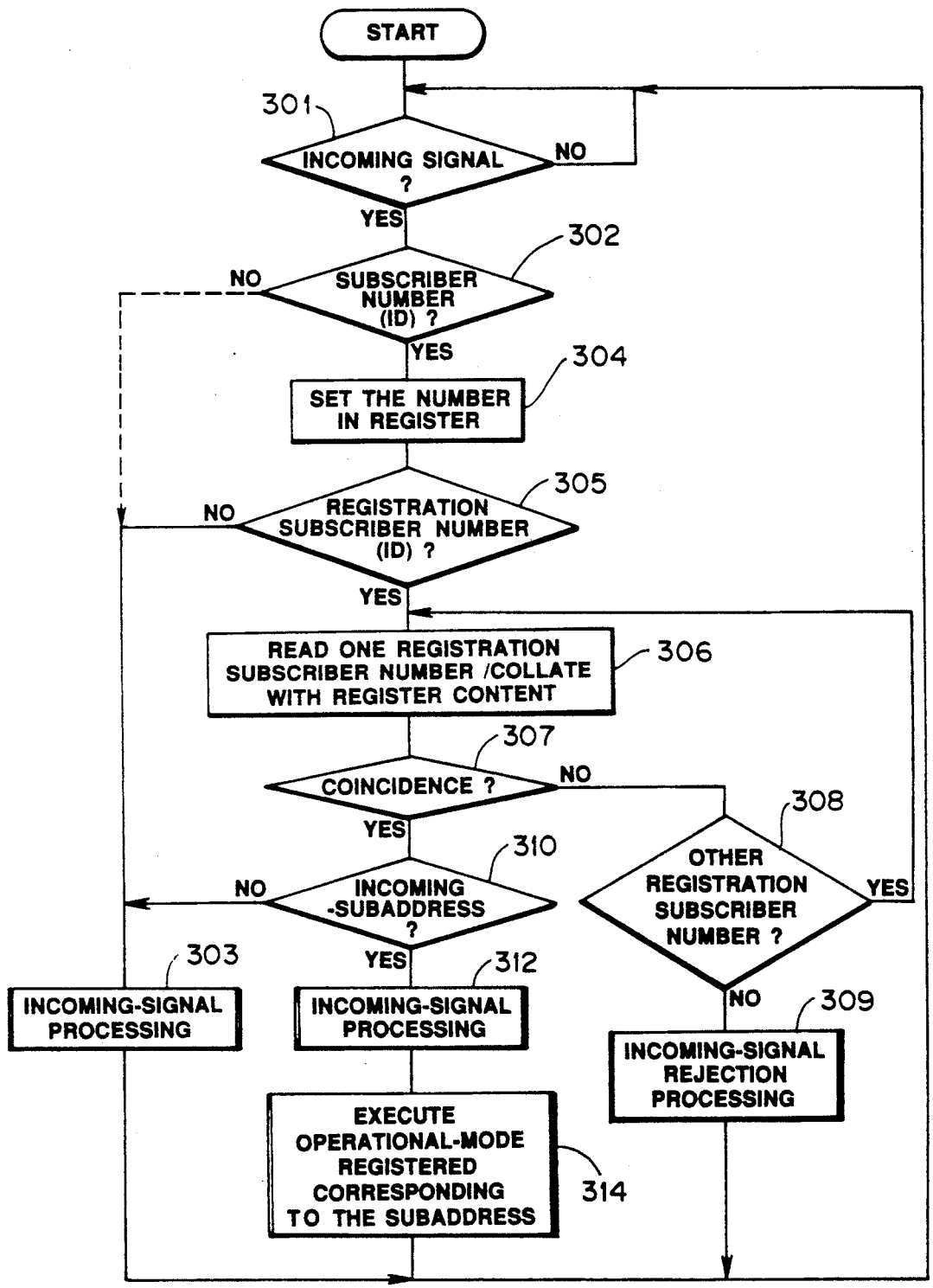
FIG. 9 is a flowchart showing another example of the operation of the communication terminal apparatus of the third embodiment shown in FIG. 5.

The above operational-mode automatic-selection processing has been carried out only when not only the subscriber number but also its subaddress coincides with the registered one as shown by step 311 (the above processing (10)) in the foregoing embodiment based on the operational example shown in FIG. 8. However, such processing as shown, for example, in FIG. 9 may also be employed. That is, when the central controller 1 determines a subscriber number coincidence (step 307 in FIG. 9) and there is a subaddress in the incoming signal (step 310 in FIG. 9), the controller performs its incoming-signal processing operation in accordance with the predetermined transmission control procedure (step 312 in FIG. 9); and subsequently if the operational mode data corresponding to the "function identification data" in the subaddress is already registered in the operational mode memory 65, then the controller 1 reads out through the memory controller 66 the registered operational-mode data and controls the present embodiment apparatus to be automatically shifted to the operational mode indicative of the read-out operational-mode data (step 314 in FIG. 9).

The third embodiment apparatus is also substantially the same as the foregoing embodiment apparatuses with respect to the following points.

The reading control system of these subscriber numbers through the memory controller 66 is not restricted to the aforementioned system but may be arbitrarily employed so long as the system allows the comparison or collation of all the subscriber numbers being registered in the caller ID memory 64.

One or both of the caller ID memory 64 and the auxiliary data memory 65 may comprise such an external memory freely detachable from the body of the communication terminal apparatus (facsimile machine) as an IC card.

Figure 10:
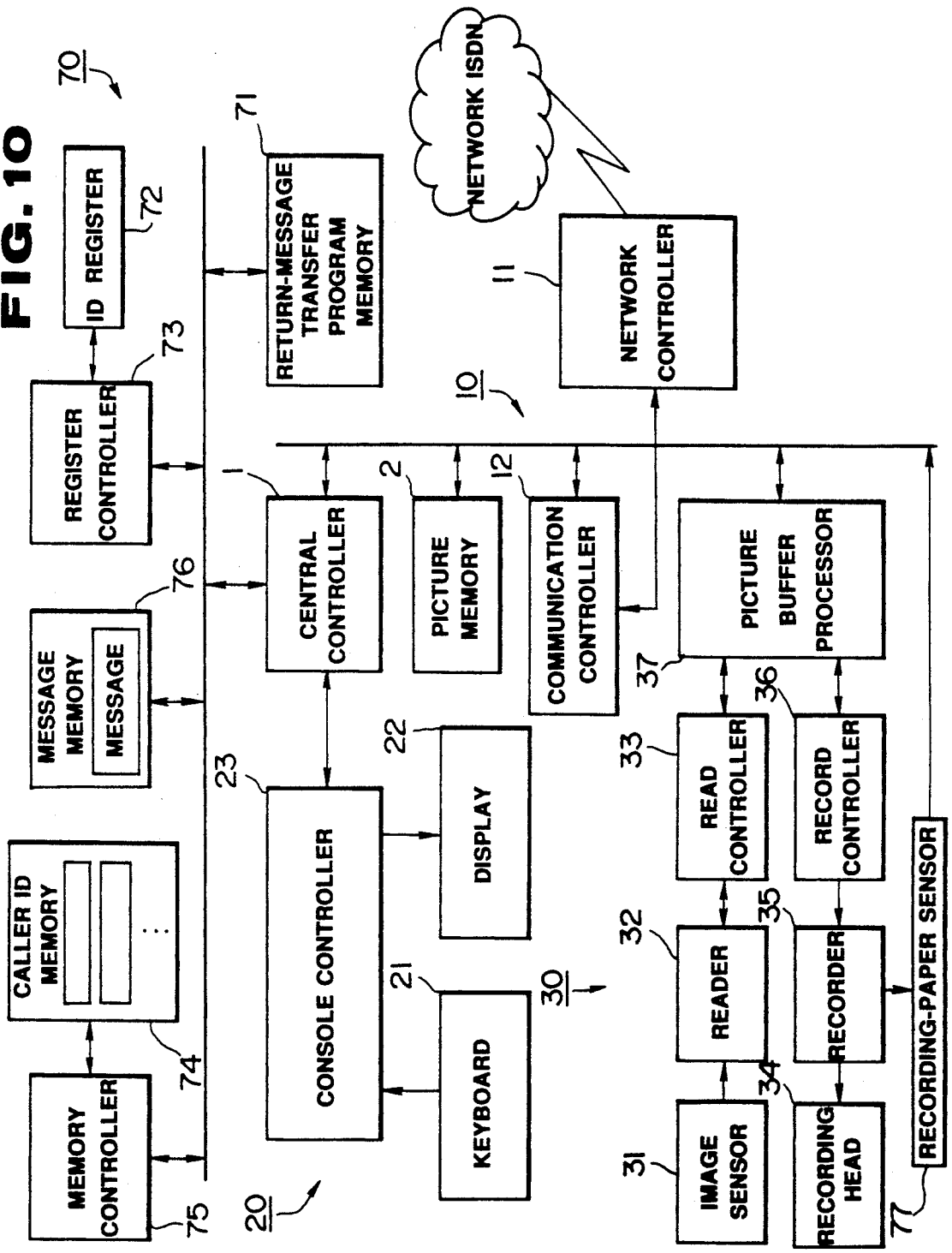
FIG. 10 is a block diagram showing the arrangement of a fourth embodiment of the communication terminal apparatus in accordance with the present invention.

FIG. 10 shows a fourth embodiment of the communication terminal apparatus of the present invention, in which embodiment the apparatus is also intended to be a facsimile machine connected to the ISDN, as in the first embodiment.

The apparatus of the fourth embodiment, as shown in FIG. 10, comprises, as a whole, a central controller 1 for performing general control over the embodiment apparatus, a picture memory 2 for temporarily storing therein picture data as necessary under control of the central controller 1, a communication part 10 for performing mainly control and processing on the communication of the embodiment apparatus, a console part 20 for performing data or information transaction with the user (operator), a picture processing part 30 for executing such picture processing as reading or writing a picture data as the facsimile machine, and a fourth expansion part 70 for realizing return-message transfer processing of the fourth embodiment apparatus to be detailed later in association with the functions of these parts 1, 10, 20 and 30. The parts other than the fourth expansion part 70 are the same as those in the foregoing embodiment apparatuses and thus the following explanation will be concentrated on the arrangement and function of the fourth expansion part 70.

As shown in FIG. 10, the fourth expansion part 70 includes a return-message transfer program memory 71 for previously storing therein processing commands to the central controller 1 in the form of a program to realize an operational-mode automatic selection processing to be explained later, an ID register 72 for temporarily storing therein a caller subscriber number when an incoming signal received at the communication part 10 contains the subscriber number as an identification data ID, a register controller 73 for controlling the reading and writing operations of the data (number) of the ID register 72 on the basis of commands from the central controller 1, a caller ID memory 74 for further temporarily storing and registering therein the subscriber number (indentification data ID) that was received when the embodiment apparatus put in its communication disable state, i.e., that was temporarily stored in the ID register 72, a memory controller 75 for controlling the reading and writing operations of the data of these memories 74 in accordance with commands from the central controller 1, a message memory 76 for previously storing therein such document data indicative of a return message as shown, for example, in FIG. 11, and a recording paper sensor 77 disposed in the recorder 35 for always detecting the presence or absence of a state.

With such a return message as shown in FIG. 11, its description matters are entered through the keyboard 21, for example, under a suitable guide indication on the screen of the display 22 and its time description matter, in particular, is automatically listed through the central controller 1 (usually incorporating a timer) during the transmission of the return message.

Figure 12:
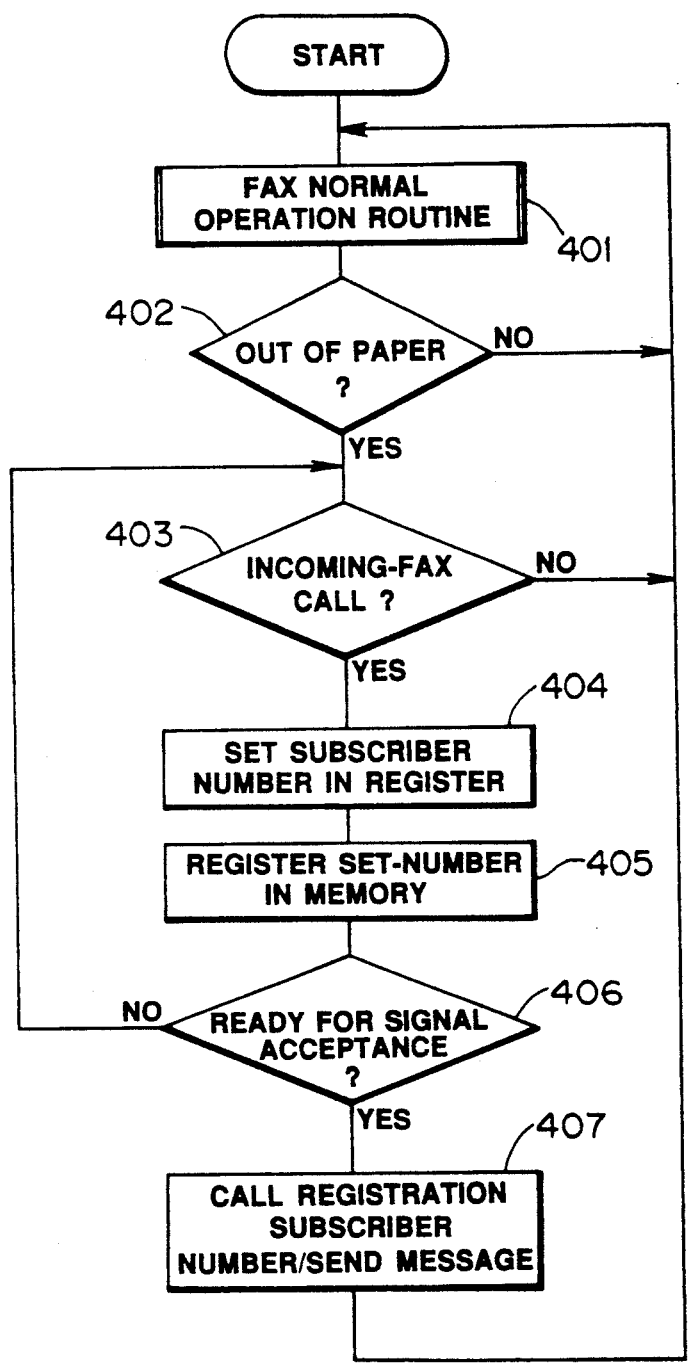
FIG. 12 is a flowchart showing another example of the operation of the communication terminal apparatus of the fourth embodiment shown in FIG. 10.

FIG. 12 shows an example of the operation of the third embodiment apparatus based on the function (in particular, a program registered in the aforementioned return-message transfer program memory 71) of the fourth expansion part 70. The return-message transfer mechanism of the fourth embodiment apparatus will be detailed in the following by referring to FIG. 12.

Assume now that another communication terminal (a not shown facsimile machine) connected to the ISDN issued a signal to the fourth embodiment apparatus shown in FIG. 10. Then the caller communication terminal first sends to the ISDN a signal for calling the fourth embodiment apparatus (which signal is referred to as the calling signal). The calling signal usually contains data indicative of a caller subscriber number previously designated to the signal-originator (caller) communication terminal.

The calling signal thus sent to the ISDN from the caller communication terminal is received as an incoming call signal at the network controller 11 of the embodiment apparatus through the ISDN line (D channel).

Meanwhile, the central controller 1 is executing a normal facsimile operation routine under the condition that the detection output of the recording-paper sensor 11 does not indicate an out-of-recording-paper state (steps 401 and 402 in FIG. 12). Under such a condition, if the embodiment apparatus receives the above incoming-call signal, then the central controller 1 controls the embodiment apparatus to perform its normal incoming-call answering operation. In this case, a picture data transmitted on the incoming-call signal is suitably demodulated through the communication controller 12, transferred to the picture buffer processor 37, and then recorded on a recording paper through the recorder 35.

Under the condition that the detection output of the recording-paper sensor 77 indicates an out-of-paper state, that the embodiment apparatus (facsimile machine) is put in its communication disable state. On the other hand, if the network controller 11 receives the incoming-call signal as mentioned above, then the fourth embodiment apparatus starts the following processing operations in sequence on the basis of the determination of the presence of the incoming signal by the central controller 1 (step 403 in FIG. 12). In the case of the detection of such an out-of-paper state, the central controller 1 also informs the operator of the out-of-paper by means of, for example, an out-of-paper message indicated on the display 22 through the console controller 23, whereby the operator can quickly conduct such restoring work as recording-paper supplement on the basis of such message display.

In parallel with the above operator's work, the fourth embodiment apparatus carries out the following processings.

(1) The central controller 1, when determining the presence of the incoming signal on the basis of the notification from the network controller 11, further determines through the netowork controller 11 the inclusion of the subscriber number of the caller communication terminal in the incoming-call signal and sets (stores)

through the register controller 73 the caller subscriber number in the register 72 (step 404 in FIG. 12). In this connection, if another subscriber number (which is an old subscriber number included in the previous incoming-call signal) is already set in the ID register 72, then the old subscriber number is updated to this newly received one, except when the memory of the ID register 72 is cleared each time the processing is completed.

(2) The central controller 1 then stores and registers the caller subscriber number set in the ID register 72 into the caller ID memory 74 through the memory controller 75 (step 405 in FIG. 12).

(3) During the above operation, the central controller 1 is continuously monitoring whether or not the operator's restoring work has been completed on the basis of the detection output of the recording-paper sensor 77 or an operator's work-completion report through the keyboard 21. At the same time, the controller 1 checks whether or not the embodiment apparatus is in a communication able state or signal-reception able state (step 406 in FIG. 12). During the communication disable state of the embodiment apparatus, if the apparatus receives a plurality of incoming call signals from a plurality of callers, then it repeats the above processings (1) and (2) for each reception of the incoming signals and registers a plurality of subscriber numbers of the plurality of callers in the caller ID memory 74.

(4) The central controller 1, when determing to be a signal-reception able state (step 406 in FIG. 12), reads out under the memory controller 75 the subscriber numbers registered in the caller ID memory 74 on a one-after-one basis and performs its calling processing of the read-out subscriber number through the communication part 10. The central controller 1, after being put in its data-transaction enable state with respect to the party (called-party or call-receiver) communication terminal (facsimile machine), reads out the associated return-message data from the message memory 76 and transmits it to the party communication terminal newly put in the communication state (step 407 in FIG. 12).

Through the above processings of the fourth embodiment apparatus, the return message thus transmitted can be received and recorded in the new party communication terminal (facsimile machine) through a usual operational routine. Therefore, the party communication terminal can immediately know, on the basis of the received and recorded message, that the fourth embodiment apparatus has been returned to the communication able state and thus it can again call the fourth embodiment apparatus at any time thereafter. With respect to this point, the fourth embodiment apparatus can reduce useless operations and waiting time to a large extent, when compared with the prior art which requires frequent calling operations without knowing its restoration time, whereby the operator can comfortably communicate with the party.

Though explanation has been made, for brevity of explanation, as to only the case where the apparatus is put in the communication disable state when it is out of recording-paper in the foregoing embodiment, it will of course be noted that the present invention is not limited to the specific embodiment but may be arranged so that the communication disable state of the apparatus is caused by other factors such as a busy state in a copying mode and so on, in addition to the above out-of-paper state.

The transfer service of the above return message has been carried out with respect to callers so long as the caller subscriber numbers are included in the respective incoming signals from the callers in the foregoing embodiment. However, the present embodiment may also be modified so that particular caller subscriber numbers are previously registered as in the first and third embodiments and the return-message transfer service is carried out only for the caller communication terminals of these registered subscriber numbers.

Figure 13:
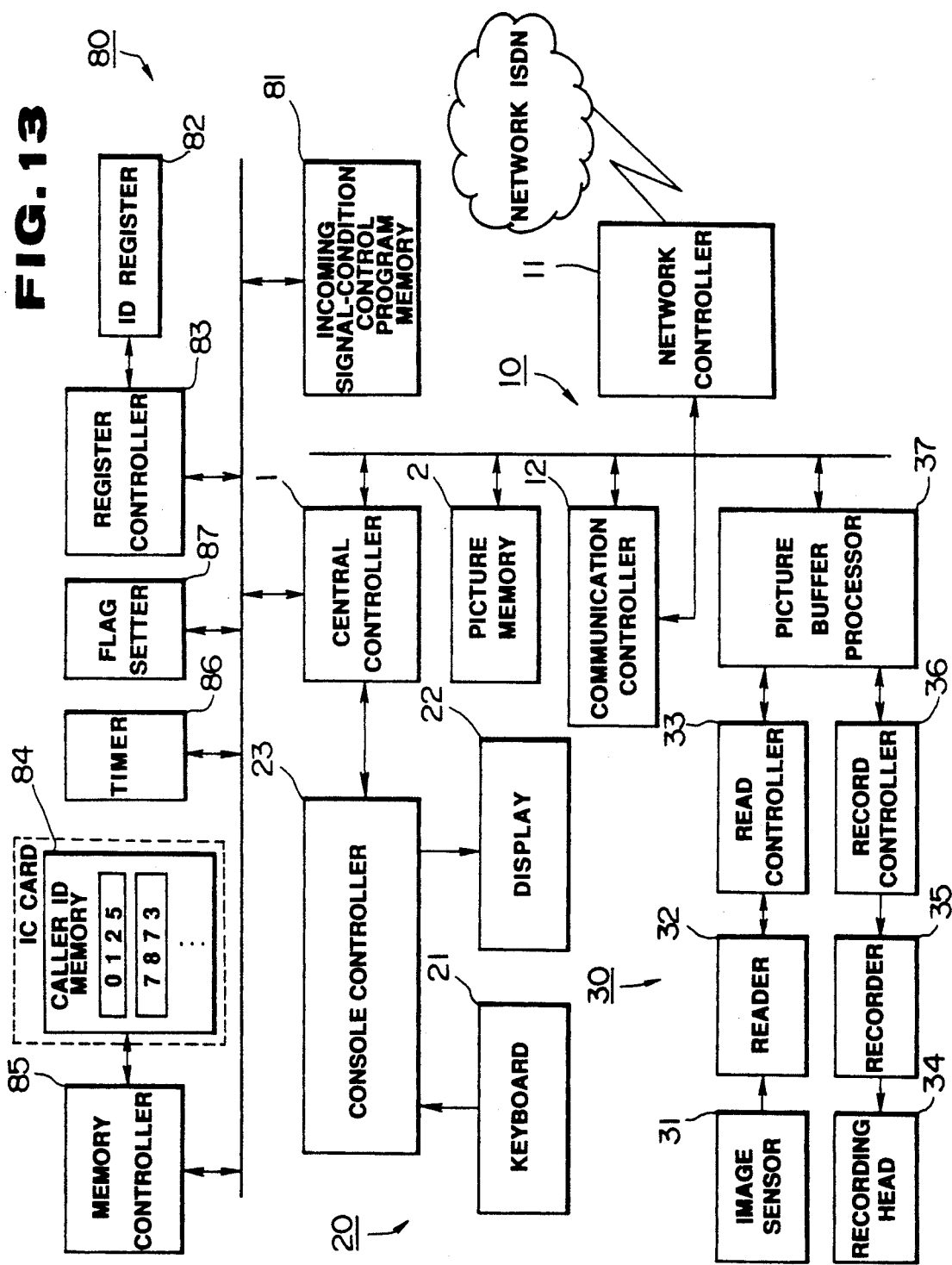
FIG. 13 is a block diagram showing the arrangement of a fifth embodiment of the communication terminal apparatus in accordance with the present invention.

FIG. 13 shows a fifth embodiment of the communication terminal apparatus of the present invention, in which embodiment the apparatus is intended to be a facsimile machine connected to the ISDN, as in the foregoing embodiments.

The apparatus of the fifth embodiment, as shown in FIG. 13, comprises, as a whole, a central controller 1 for performing general control over the embodiment apparatus, a picture memory 2 for temporarily storing therein picture data as necessary under control of the central controller 1, a communication part 10 for performing mainly control and processing on the communication of the embodiment apparatus, a console part 20 for performing data or information transaction with the user (operator), a picture processing part 30 for executing such picture processing as reading or writing picture data as the facsimile machine, and a fifth expansion part 80 for realizing incoming-signal condition control or management to be detailed later in association with the functions of these parts 1, 10, 20 and 30. The parts other than the fifth expansion part 80 are the same as those in the foregoing embodiment apparatuses and thus the following explanation will be concentrated on the arrangement and function of the fifth expansion part 80.

As shown in FIG. 13, the fifth expansion part 80 includes an incoming-signal-condition management program memory 81 for previously storing therein processing commands to the central controller 1 in the form of a program to realize incoming-signal condition management to be explained later, an ID register 82 for temporarily storing therein a caller subscriber number when an incoming signal received at the communication part 10 contains the subscriber number as an identification data ID, a register controller 83 for controlling the reading and writing operations of the data (number) of the ID register 82 on the basis of commands from the central controller 1, a caller ID memory 84 for previously registering therein, as necessary, a single or a plurality of caller subscriber numbers as identification data IDs specifying associated caller communication terminals, a memory controller 85 for controlling the reading and writing operations of the data of the memory 84 in accordance with commands from the central controller 1, a timer 86 for executing timing operations on the basis of a timer time set through the console part 20, and a flag setter 87 for setting or resetting a flag as an index for the incoming signal condition management under the predetermined control of the central controller 1.

The subscriber number or numbers to be registered in the caller ID memory 84 are entered as necessary through the keyboard 21 with the help of, for example, a suitable guide indication on the screen of the display 22, as a single or a plurality of specific caller subscriber numbers on the basis of which the associated incoming signals are granted or rejected. Further, the timer time to be set at the timer 86 is entered also through the keyboard 21 with the help of, for example, a suitable guide indication on the screen of the display 22, as an effective time for the setting of the condition of the incoming signal from the particular caller (the granting or rejection of the incoming signal).

Figure 14:
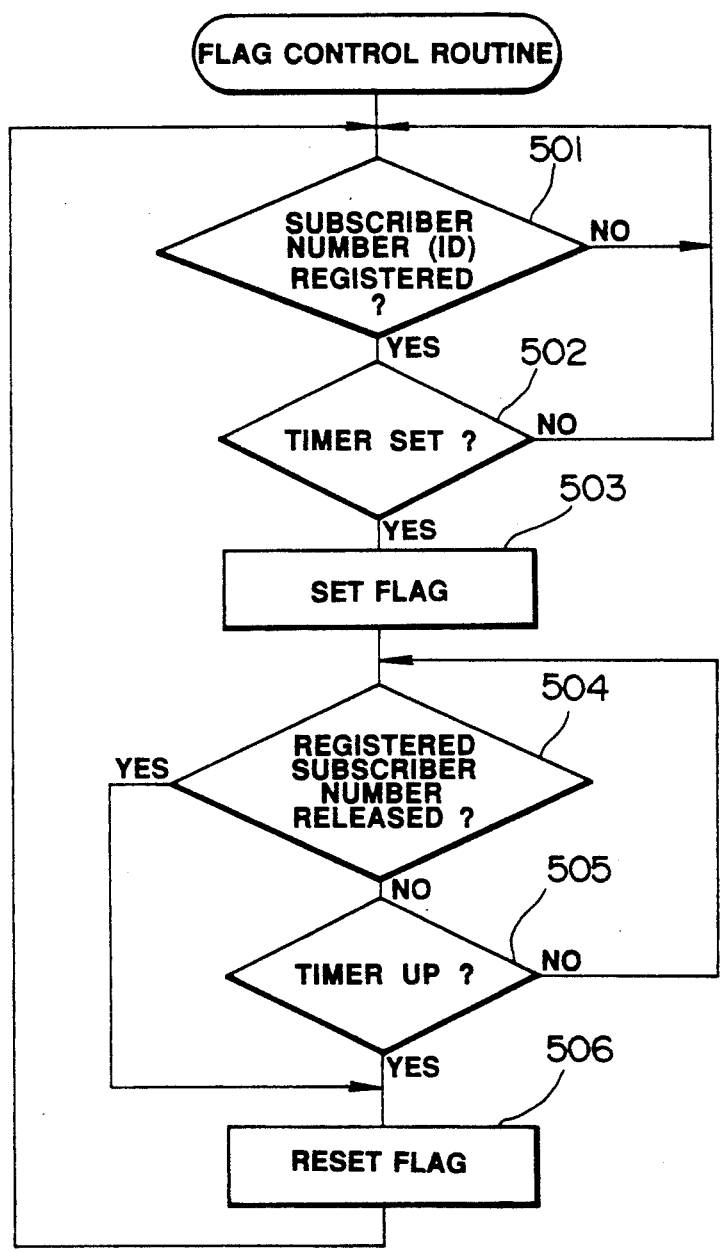
FIG. 14 is a flowchart showing an example of the processing of a flag control routine for use with the communication terminal apparatus of the fifth embodiment shown in FIG. 13.

The flag setting and resetting of the flag setter 87 is controlled by the central controller 1 in accordance with such a flag control routine as shown in FIG. 14, the flag being used as an index indicative of whether or not the setting of the above incoming-signal condition for the subscriber number registered in the caller ID memory 84 and for the timer time set at the timer 86.

For example:

(1) The central controller 1 controls the flag setter 87 to be put in its set state (step 503 in FIG. 14) in accordance with the flag control routine when the AND condition is satisfied that the subscriber number is already registered in the caller ID memory 84 (step 501 in FIG. 14) and that the timer time is already set at the timer 86 (step 502 in FIG. 14).

(2) When the subscriber number registered in the caller ID memory 84 is deleted during the above timer time period, that is, the registration of the subscriber number specifying the caller is released (step 504 in FIG. 14), or when the timer 86 generates a timer signal indicative of its time-up (step 505 in FIG. 14), the central controller 1 causes the flag setter 87 to be put in its reset state (step 506 in FIG. 14).

Figure 15:
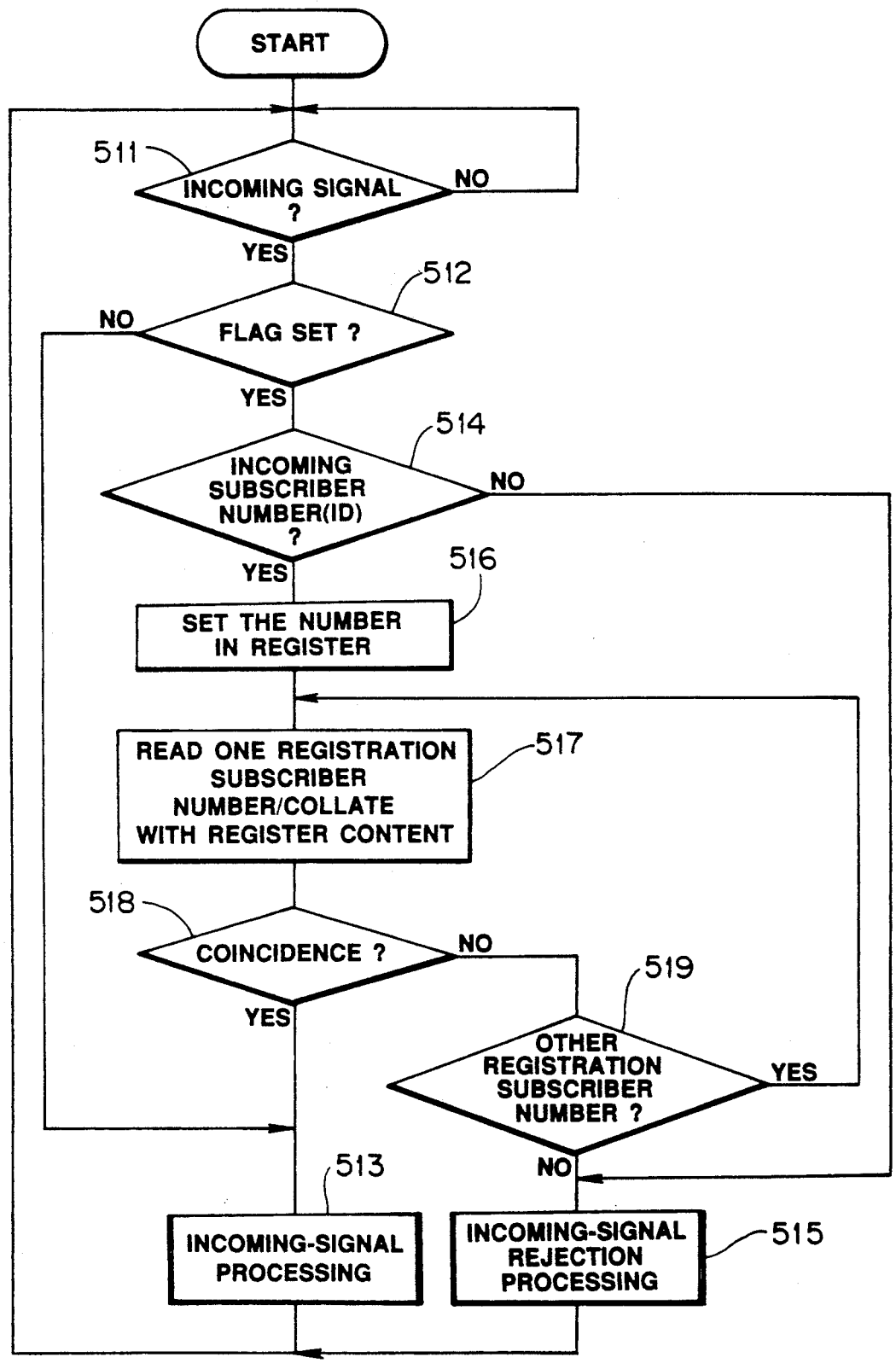
FIGS. 15, 16, 17 and 18 are flowcharts showing different examples of operation of the communication terminal apparatus of the fifth embodiment of FIG. 13 based on the flag control routine of FIG. 14 respectively.

FIG. 15 shows an example of the operation of the present embodiment apparatus based on the function (in particular, a program registered in the aforementioned incoming-signal condition management program memory 81) of the fifth expansion part 80. The incoming-signal condition management mechanism of the fifth embodiment apparatus will be detailed in the following by referring to FIG. 15.

Assume now that another communication terminal (a not shown facsimile machine) connected to the ISDN issued a signal to the fifth embodiment apparatus shown in FIG. 13. Then the caller communication terminal first sends to the ISDN a signal for calling the fifth embodiment apparatus (which signal is referred to as the calling signal). The calling signal usually contains data indicative of a caller subscriber number previously designated to the signal-originator (caller) communication terminal.

The calling signal thus sent to the ISDN from the caller communication terminal is received as an incoming call signal at the network controller 11 of the embodiment apparatus through the ISDN line (D channel).

The fifth embodiment apparatus, when receiving the incoming call signal at the network controller 11 and recognizing the presence of the incoming signal at the central controller 1 (step 511 in FIG. 15), starts its processing in the following manner.

(1) The central controller 1, when determining the presence of the incoming signal on the basis of an incoming-signal notification from the network controller 11, first checks whether or not the flag setter 87 is in its set state (step 512 in FIG. 15).

(2) When determining through the check that the flag setter 87 is not set, the central controller 1 controls the present embodiment apparatus to perform its usual incoming-signal processing operation (step 513 in FIG. 15).

(3) If determining through the check (step 512 in FIG. 15) that the flag setter 87 is set, then the central controller 1 judges through the network controller 11 whether or not the subscriber number of the caller communication terminal is included in the incoming signal (step 514 in FIG. 15).

(4) When determining that the caller subscriber number is not included in the incoming signal, the central controller 1 controls the embodiment apparatus to perform its incoming-signal rejecting operation to reject the reception of the incoming signal (step 515 in FIG. 15).

(5) When determining through the judgement (step 514 in FIG. 15) that the caller subscriber number is included in the incoming signal, the central controller 1 causes the register controller 83 to set (store) the included caller subscriber number in the ID register 82 (step 516 in FIG. 15). At this time, if another caller subscriber number (corresponding to the previous incoming signal) is already set in the ID register 82, then the previous caller subscriber number is replaced by the new one for its renewal, unless the ID register 82 is cleared each time the processing is completed. Further, if the subscriber number of the incoming signal is attached with a subaddress, then the subaddress is also set in the ID register 62.

(6) The central controller 1 then reads out one of the subscriber numbers from the caller ID memory 84 through the memory controller 85 and collates or compares the read-out subscriber number with that set in the ID register 82 (step 517 in FIG. 15).

(7) When there is a non-coincidence in subscriber number as the comparison result (step 518 in FIG. 15), the central controller 1 repeats the above processing (6) (step 517 in FIG. 15) so long as other caller subscriber numbers are registered in the caller ID memory 84 (step 519 in FIG. 15). When the central controller 1 determines that none of the subscriber numbers registered in the caller ID memory 84 coincide with the subscriber number set in the ID register 82, the controller 1 controls the embodiment apparatus to perform the incoming-signal rejecting operation (step 515 in FIG. 15) as in the above processing (4).

(8) When determining through the comparison (step 517 in FIG. 15) a subscriber number coincidence (step 518 in FIG. 15), the central controller 1 determines that it is data transmission from the caller for which the apparatus accepts its incoming signal and controls the present embodiment apparatus to perform its usual incoming-signal processing operation (step 513 in FIG. 15).

In this way, through the above processings of the fifth embodiment apparatus, the apparatus can automatically execute its incoming signal processing operation under different conditions (A-1) and (A-2) that the flag setter 87 is set or not as follows.

(A-1) When the flag of the flag setter 87 is set, that is, when the particular subscriber number on the caller is previously registered and the timer time is effective, the embodiment apparatus answers to the call only from the registered subscriber and performs the incoming-signal processing operation in response to the incoming call while rejecting calls from the other subscribers not registered.

(A-2) If the flag is not set, the embodiment apparatus answers calls from any subscribers and performs the incoming-signal processing operation, that is, the apparatus is put in an open state to all the subscribers.

Accordingly, the modification of the incoming-signal conditions to, e.g. "the apparatus receives data (picture data) only from company A during one hour alone and then accepts all data received thereafter" can be freely realized even in the absence of any operator, so long as the aforementioned setting for the caller ID memory 84 and timer 86 is previously effected as necessary.

In the foregoing embodiment, the above incoming-signal condition (A-1) or (A-2) has been set according to the presence or absence of the setting of the flag setter 87, but the present invention is not restricted to the particular example. For example, when the incoming-signal condition control program for the memory 81 is set to cause such operation as shown in FIG. 16, the present apparatus may similarly operate as follows depending on the presence or absence of the setting of the flag setter 87.

(B-1) When the flag of the flag setter 87 is set, that is, when the particular subscriber number of the caller is previously registered and the timer time is effective, the embodiment apparatus answers the call only from the registered subscriber and performs the incoming-signal processing operation in response to the incoming call while rejecting calls from the other subscribers not registered.

(B-2) If the flag is not set, the embodiment apparatus rejects incoming signals from any subscribers, that is, the apparatus is put in a closed state to all the subscribers.

Figure 16:
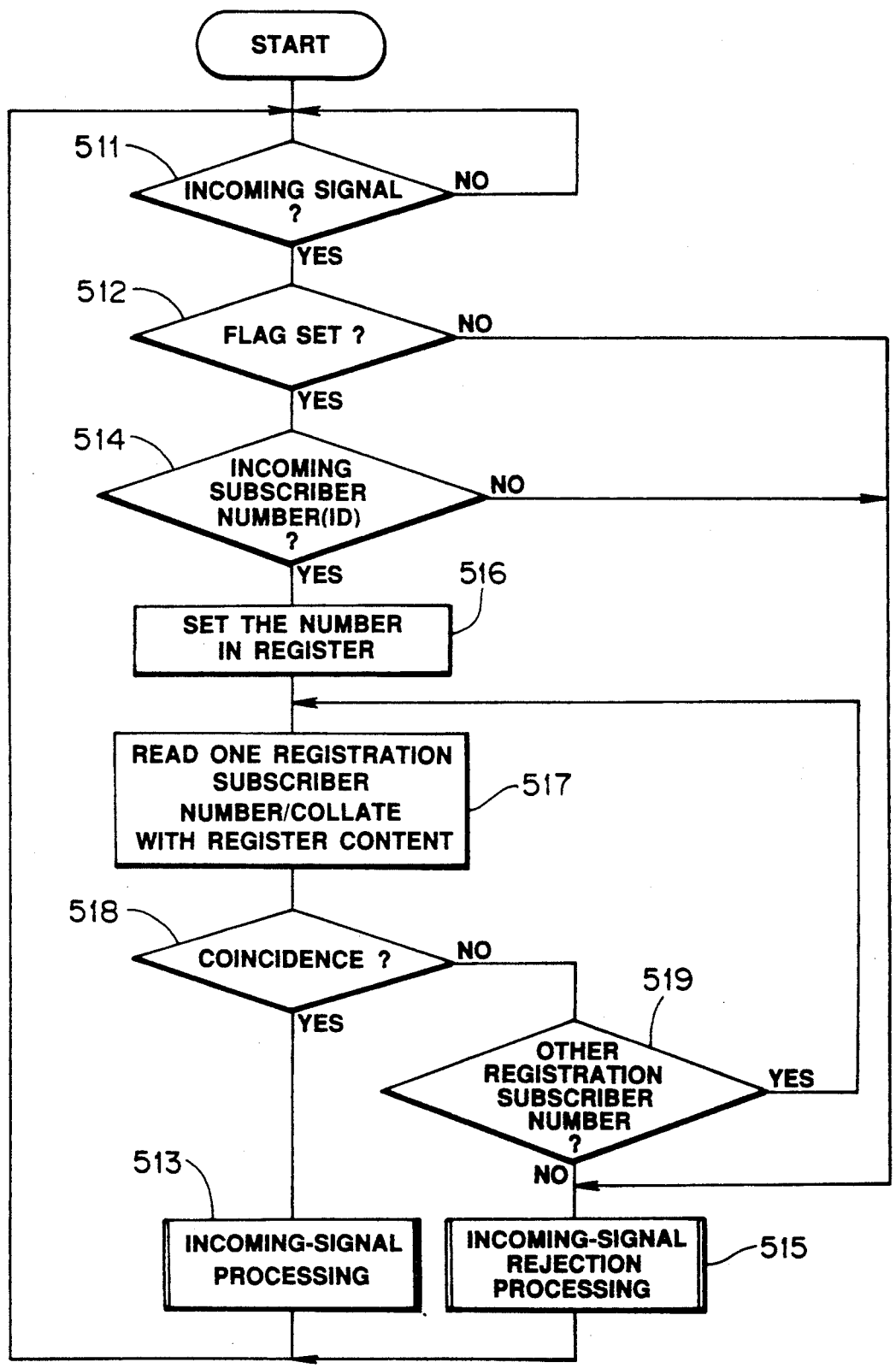
Figure 17:
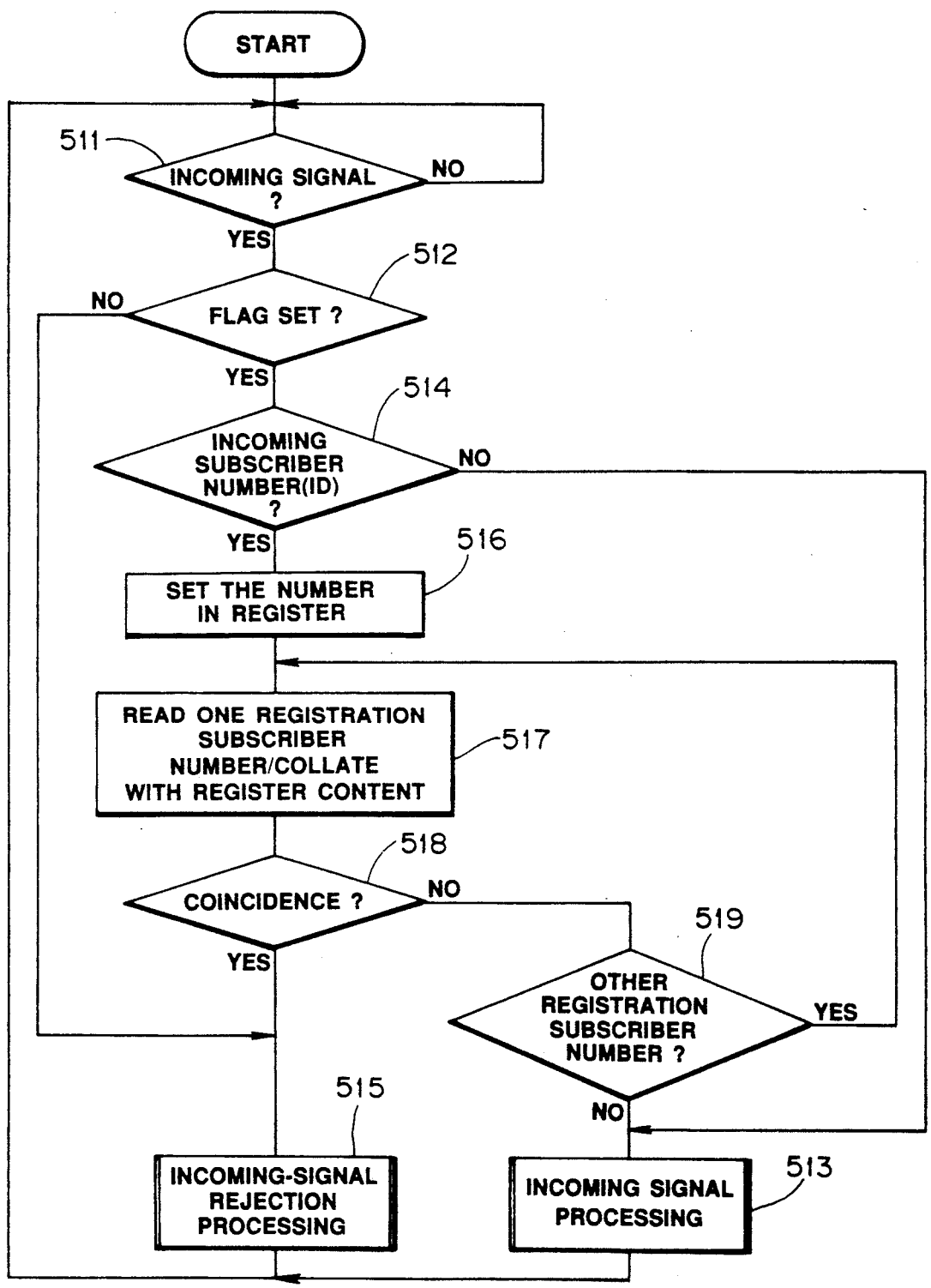
Figure 18:
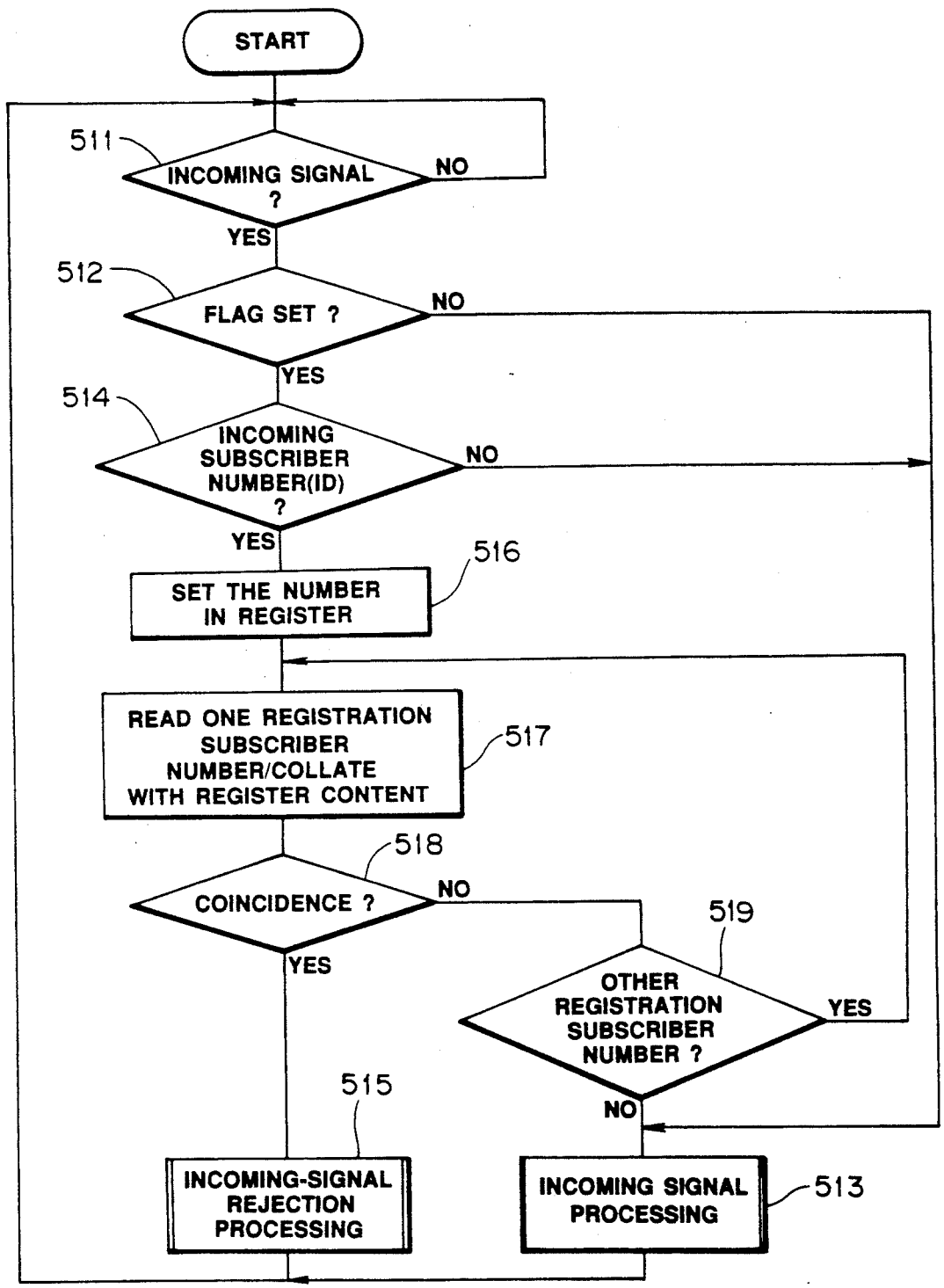

For example, when the incoming-signal condition control program for the memory 81 is also set to cause such operation as shown in FIG. 16, the present apparatus may similarly operate as follows depending on the presence or absence of the setting of the flag setter 87.

(C-1) When the flag of the flag setter 87 is set, that is, when the particular subscriber number on the caller is previously registered and the timer time is effective, the embodiment apparatus rejects the reception of an incoming call only from the registered subscriber while normally calls from the other subscribers not registered and performing its incoming-signal processing operation.

(C-2) If the flag is not set, the embodiment apparatus rejects incoming signals from any subscribers, that is, the apparatus is put in a closed state to all the subscribers.

Further, when the incoming-signal condition control program for the memory 81 is set to cause such operation as shown in FIG. 16, the present apparatus may similarly operate as follows depending on the presence or absence of the setting of the flag setter 87.

(D-1) When the flag of the flag setter 87 is set, that is, when the particular subscriber number on the caller is previously registered and the timer time is effective, the embodiment apparatus rejects the reception of an incoming call only from the registered subscriber while normally answering calls from the other subscribers not registered and performs its incoming-signal processing operation.

(D-2) If the flag is not set, the embodiment apparatus answers to incoming signals from any subscribers and performs the incoming-signal processing operation, that is, the apparatus is put in an open state to all the subscribers. It goes without saying that these incoming-signal condition control programs may be previously prepared to be selected freely as necessary.

Although the timer 86 has been provided and the flag setter 87 has been set on the AND condition that the subscriber number is previously registered in the caller ID memory 84 and the timer time is previously set in the timer 86 in the foregoing fifth apparatus shown in FIG. 13, the provision of the timer 86 is not the essential requirement of the fifth embodiment. In other words, the flag setter 87 may also be set only under such condition that the subscriber number is previously registered in the caller ID memory 84.

Although the communication network has been intended to be the ISDN and the apparatus has been intended to be a facsimile machine in any of the foregoing first to fifth embodiments, the communication terminal apparatus of the present invention is, as a matter of course, not restricted to these particular ISDN and facsimile machine but a telephone set, a telex equipment or so on other than the facsimile machine may be employed, in particular, as the communication terminal.

The different functions of the communication terminal apparatuses in accordance with the present invention have been illustrated separately as the foregoing first to fifth embodiments in the foregoing explanation. However, the respective expansion parts in the respective embodiments may be arbitrarily selected and combined to more effectively improve the user interface and communication efficiency. That is, in actual applications, these embodiments may, of course, be utilized in arbitrary combination therebetween as necessary.

What is claimed is:

1. A communication terminal apparatus connected to a communication network through a data channel for transfer of line transaction data or packet transaction data and through a signal channel for control of a call from a transmitter to a communication destination party, the apparatus comprising:

a first memory for storing previously registered predetermined caller identification data to be transmitted through the communication network and the signal channel;

a second memory for temporarily storing received caller identification data each time the communication terminal apparatus receives caller identification data transmitted through the communication network and the signal channel from the transmitter;

a third memory for temporarily storing therein transaction data received through the communication network and the data channel;

a fourth memory for storing previously registered receiver registration identification data corresponding to a plurality of destination communication terminal apparatuses, to which the transaction data from a communication terminal apparatus associated with one of the caller identification data stored in the first memory is to be transmitted, the receiver registration identification data being stored in one of a one-to-one relationship, a one-to-plural relationship, and a plural-to-one relationship with the predetermined caller identification data stored in the first memory;

first control means for comparing the predetermined caller identification data stored in the first memory with the received caller identification data temporarily stored in the second memory, and for transmitting the transaction data to the third memory upon detection of a coincidence between one of the predetermined caller identification data and the received caller identification data;

second control means for automatically calling one of the receiver registration identification data stored in the fourth memory corresponding to the coincided predetermined caller identification data; and third control means for automatically transferring the transaction data stored in the third memory to one or more of the plurality of destination communication terminal apparatuses associated with the receiver registration identification data, whereby the transaction data is transferred between the transmitter and the one or more of the plurality of destination communication terminal apparatuses with the communication terminal apparatus functioning as a relay station in accordance with the relationship between the transmitter and the previously registered receiver registration data stored in the fourth memory.

2. The communication terminal apparatus as set forth in claim 1, further comprising:

display means;

a fifth memory for storing in the receiver terminal, as knowledge data, previously registered document data including proper nouns such as a subscriber's company titles, person names, and notes, in association with the predetermined caller identification data stored in the first memory; and fourth control means for comparing the predetermined caller identification data with the receiver caller identification data temporarily stored in the second memory, for reading out one of the document data from the fifth memory upon detection of a coincidence between the predetermined caller identification data and the received caller identification data, and for displaying the readout document data on the display means, wherein the communication terminal apparatus functions as a private database which is automatically invoked through the first through third memories and the fourth control means, in response to a call from the transmitter.

3. The communication terminal apparatus as set forth in claim 2, wherein the fifth memory comprises a detachable external memory IC card.

4. The communication terminal apparatus as set forth in claim 1, further comprising:

a sensor for detecting a communication disable state of the apparatus;

a seventh memory for storing the received caller identification data temporarily stored in the second memory;

an eighth memory for storing previously registered message data notifying return of the apparatus to a communication enable state from the communication disable state; and sixth control means for transferring and storing the received caller identification data stored in the second memory to the seventh memory when the sensor detects the communication disable state, and for automatically calling the received caller identification data stored in the seventh memory and automatically transferring the message data stored in the eighth memory to the at least one of the destination communication terminal apparatuses associated with the predetermined caller identification data upon detection of the communication enable state by the sensor.

5. The communication terminal apparatus as set forth in claim 4, wherein the apparatus is a facsimile machine and the sensor detects an out-of-recording-paper state of the facsimile machine.

6. The communication terminal apparatus as set forth in claim 1, wherein at least one of the first and fourth memories comprises a detachable external memory IC card.

7. The communication terminal apparatus as set forth in claim 1, wherein the predetermined caller identification data and the received caller identification data include at least one of a subscriber number previously designated to one of a plurality of subscribers of the communication network, and subaddress data arbitrarily set among subscribers as data additional to the subscriber number.

8. The communication terminal apparatus as set forth in claim 7, further comprising:

signal-reception-condition setting means for setting reception conditions of the transaction data transmitted through the communication network and the data channel; and fourth control means for carrying out retrieval of the predetermined caller identification data stored in the first memory based on the received caller identification data temporarily stored in the second memory when the conditions set by the signal-reception-condition setting means are satisfied, and causing unconditional rejection of reception of the transaction data when the conditions set by the signal-reception-condition setting means are not satisfied.

9. The communication terminal apparatus as set forth in claim 8, wherein the signal-reception-condition setting means comprises:

timer means for setting a desired time; and means for setting a flag when the predetermined caller identification data coincides with the received caller identification data, and when the desired time set by the timer means is valid, wherein the conditions set by the signal-reception-condition setting means are satisfied when the flag is set.

10. The communication terminal apparatus as set forth in claim 7, further comprising:

signal-reception-condition setting means for setting reception conditions of the transaction data transmitted through the communication network and the data channel: and fourth control means for carrying out retrieval of the predetermined caller identification data stored in the first memory based on the received caller identification data temporarily stored in the second memory when the condition set by the signal-reception-condition setting means are satisfied, and causing unconditional granting of reception of the transaction data when the conditions set by the signal-reception-condition setting means are not satisfied.

11. The communication terminal apparatus as set forth in claim 10, wherein the signal-reception-condition setting means comprises:

timer means for setting a desired time; and means for setting a flag when the predetermined caller identification data coincides with the received caller identification data, and when the desired time set by the timer means is valid, wherein the conditions set by the signal-reception-condition setting means are satisfied when the flag is set.

12. The communication terminal apparatus as set forth in claim 7, wherein the caller identification data includes both the subscriber number and subaddress data, the apparatus further comprising:

a sixth memory for storing previously registered mode data, as a table, indicative of at least one operational mode of the apparatus, the mode data comprising at least part of the subaddress data; and fifth control means for comparing the predetermined subscriber number and the subaddress data with the received caller subscriber number and the received subaddress data, and upon detection of a coincidence, for reading out one of the mode data associated with the coincided subaddress data from the sixth memory, and for automatically carrying out the at least one operational mode corresponding to the readout mode data.

13. The communication terminal apparatus as set forth in claim 12, wherein the sixth memory comprises a detachable external memory IC card.

14. The communication terminal apparatus as set forth in claim 12, wherein the fifth control means causes retrieval from the first memory based on the received caller identification data temporarily stored in the second memory with respect to both the subscriber number and the subaddress data.

15. The communication terminal apparatus as set forth in claim 12, wherein the fifth control means causes retrieval from the first memory based on the received caller identification data temporarily stored in the second memory with respect to only the subscriber number, and wherein the subaddress data is used exclusively to select the mode data.

16. The communication terminal apparatus connected to a communication network through a data channel for transfer of line transaction data or packet transaction data and through a signal channel for control of a call from a transmitter to a communication destination party, the apparatus comprising:

a first memory for storing previously registered predetermined caller identification data, related to a plurality of subscribers, to be transmitted through the communication network and the signal channel;

a second memory for temporarily storing received caller identification data each time the communication terminal apparatus receives caller identification data transmitted through the communication network and the signal channel from the transmitter;

display means;

a third memory for temporarily storing, as knowledge data, document data including proper nouns, such as subscriber company titles, person names, and notes, in association with the caller identification data stored in the first memory; and control means for comparing the predetermined caller identification data stored in the first memory with the received caller identification data temporarily stored in the second memory, for reading out one of the document data from the third memory upon detection of a coincidence between the predetermined caller identification data and the received caller identification data, and for displaying the readout document data on the display means, wherein the communication terminal apparatus functions as a private database which is automatically invoked through the first through third memories and the fourth control means, in response to a call from the transmitter.

17. The communication terminal apparatus as set forth in claim 16, wherein the predetermined caller identification data and the received caller identification data include at least one of a subscriber number previously designated to one of the plurality of subscribers of the communication network, and subaddress data arbitrarily set among the plurality of subscribers as data additional to the subscriber number.

18. The communication terminal apparatus as set forth in claim 16, wherein at least one of the first and third memories comprises a detachable external memory IC card.

* * * * *

UNITED STATES PATENT AND TRADEMARK OFFICE
CERTIFICATE OF CORRECTION

PATENT NO. : 5,216,517
DATED : June 01, 1993
INVENTOR(S) : Haruki Kinoshita et al.

It is certified that error appears in the above-indentified patent and that said Letters Patent is hereby corrected as shown below:

Claim 2, column 25, line 24, change "receiver" to --received--.

Claim 10, column 26, line 48, change "condition" to --conditions--.

Signed and Sealed this

Twelfth Day of April, 1994

Attest:

BRUCE LEHMAN

Attesting Officer

Commissioner of Patents and Trademarks